United States Patent
Meltz et al.

(10) Patent No.: US 12,099,782 B2
(45) Date of Patent: Sep. 24, 2024

(54) SYSTEM AND METHODOLOGY FOR PERFORMANCE VERIFICATION OF MULTI-AGENT AUTONOMOUS ROBOTIC SYSTEMS

(71) Applicant: ELTA SYSTEMS LTD., Ashdod (IL)

(72) Inventors: Daniel Meltz, Rishon Lezion (IL); Amit Sirkis, Modi'in (IL)

(73) Assignee: ELTA SYSTEMS LTD., Ashdod (IL)

( * ) Notice: Subject to any disclaimer, the term of this patent is extended or adjusted under 35 U.S.C. 154(b) by 831 days.

(21) Appl. No.: 15/734,865

(22) PCT Filed: May 12, 2019

(86) PCT No.: PCT/IL2019/050533
§ 371 (c)(1),
(2) Date: Dec. 3, 2020

(87) PCT Pub. No.: WO2019/234726
PCT Pub. Date: Dec. 12, 2019

(65) Prior Publication Data
US 2021/0237772 A1    Aug. 5, 2021

(30) Foreign Application Priority Data
Jun. 5, 2018 (IL) .......................................... 259835

(51) Int. Cl.
*G06F 30/20* (2020.01)
*B60W 30/08* (2012.01)
(Continued)

(52) U.S. Cl.
CPC ............. *G06F 30/20* (2020.01); *B60W 30/08* (2013.01); *B60W 60/0015* (2020.02);
(Continued)

(58) Field of Classification Search
CPC .. G06F 30/20; G06F 18/2415; G06F 2111/10; G06F 2119/10; G06F 17/40;
(Continued)

(56) References Cited

U.S. PATENT DOCUMENTS

| 2017/0132334 A1 | 5/2017 | Levinson et al. |
| 2017/0169627 A1* | 6/2017 | Kim .................. G01S 13/862 |

(Continued)

FOREIGN PATENT DOCUMENTS

| WO | 2017079236 A2 | 5/2017 |
| WO | 2018002910 A1 | 1/2018 |

OTHER PUBLICATIONS

Chaojie Ou et al: "Monte Carlo approach to the analysis of UAVs control system", Proceedings of the IEEE Chinese Guidance, Navigation and Control Conference,Aug. 8, 2014 (Aug. 8, 2014), pp. 458-462, XP032722214, DOI: 10.1109/CGNCC.2014.7007267.

(Continued)

*Primary Examiner* — Anne Marie Antonucci
*Assistant Examiner* — Misa H Nguyen
(74) *Attorney, Agent, or Firm* — Dorsey & Whitney LLP

(57) ABSTRACT

A computerized method of performing safety and functional verification of algorithms, for control of autonomous vehicles, comprises: iteratively performing an adjustment, the adjustment comprising at least one of the following: (i) updating the value of parameter(s) indicative of noise and/or delay in simulated sensor(s), associated with a computerized simulation framework corresponding to simulated autonomous vehicle(s) and to operational environment(s), by increasing noise and/or delay; and (ii) updating the value of parameter(s) indicative of noise and/or delay in a response of the simulated autonomous vehicle(s) to command(s), by increasing the noise and/or delay. This is done until obtaining from the computerized simulation framework an (Continued)

increased-severity computerized simulation framework. The increased-severity computerized simulation framework meets a criterion that can be utilized for statistical safety verification and/or statistical functional performance verification of the algorithm(s).

37 Claims, 10 Drawing Sheets

(51) Int. Cl.
*B60W 60/00* (2020.01)
*G06F 18/2415* (2023.01)
*G06V 20/56* (2022.01)

(52) U.S. Cl.
CPC .......... *G06F 18/2415* (2023.01); *G06V 20/56* (2022.01); *B60W 2420/403* (2013.01); *B60W 2420/408* (2024.01)

(58) Field of Classification Search
CPC ............. B60W 30/08; B60W 60/0015; B60W 2420/403; B60W 2420/52; G06V 20/56; G05D 1/00; G05D 1/02; G09B 9/00
See application file for complete search history.

(56) References Cited

U.S. PATENT DOCUMENTS

2017/0363719 A1  12/2017  Ahmed et al.
2017/0364831 A1* 12/2017  Ghosh ................... G06F 40/40

OTHER PUBLICATIONS

Tuncali Cumhur Erkan et al: "Simulation-based Adversarial Test Generation for Autonomous Vehicles with Machine Learning Components", arxiv.org, Apr. 18, 2018 (Apr. 18, 2018), pp. 1-17, XP055884965,DOI: 10.1109/IVS.2018.8500421.

Meltz, Daniel, and Hugo Guterman. "RobIL—Israeli Program for Research and Development of Autonomous UGV: Performance Evaluation Methodology." 2016 IEEE International Conference on the Science of Electrical Engineering (ICSEE), 2016, pp. 1-5., doi:10.1109/icsee.2016.7806157.

Meltz, Daniel, and Hugo Guterman. "Verification of Safety for Autonomous Unmanned Ground Vehicles." 2014 IEEE 28th Convention of Electrical & Electronics Engineers in Israel (IEEEI), 2014, pp. 1-5., doi:10.1109/eeei.2014.7005895.

* cited by examiner

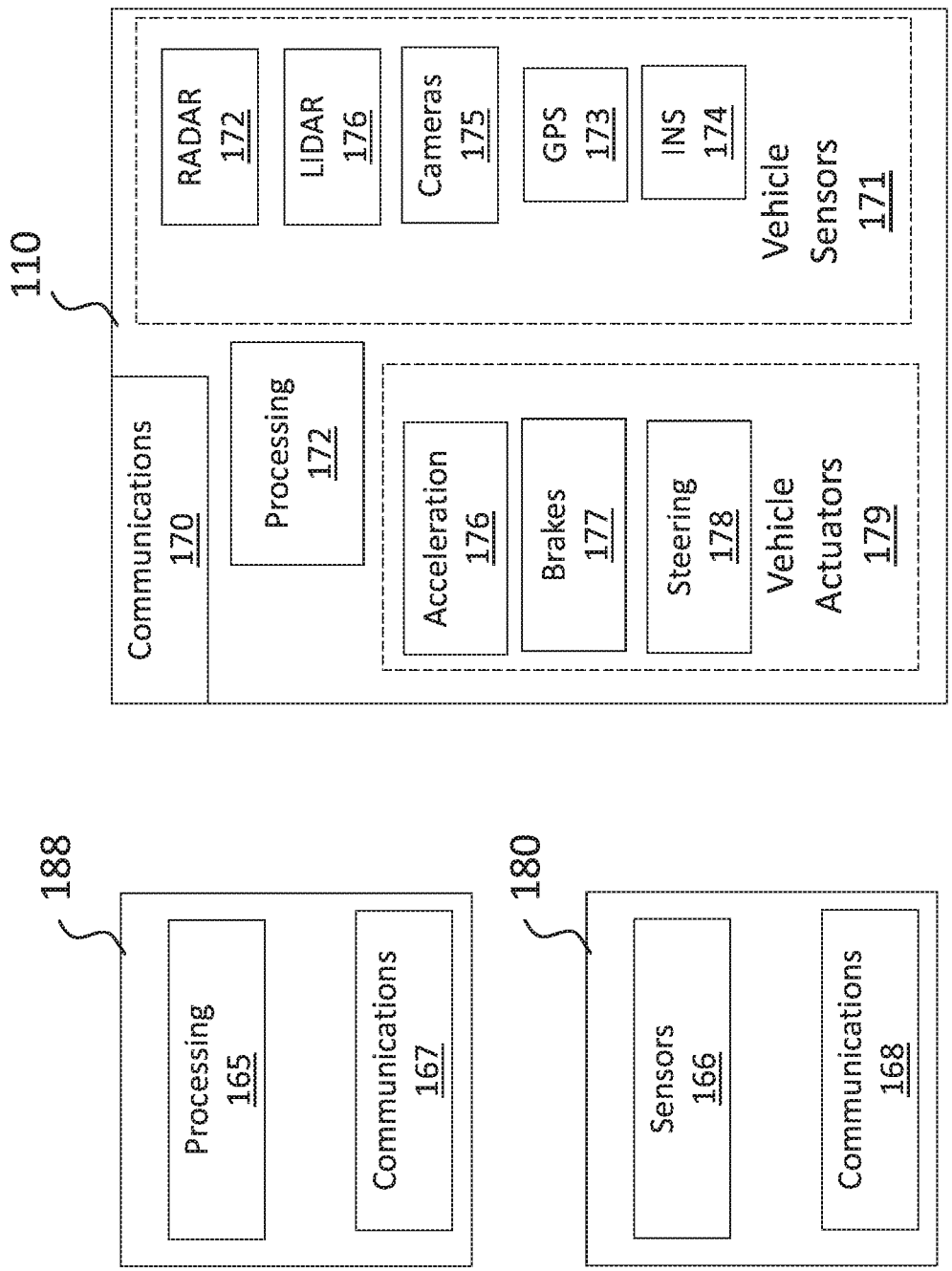

| Parameter 605 | Initial Value of added noise/delay 610 | 1st iteration 620 | 2nd iteration 630 | 3rd iteration 640 | 4th iteration – FAILS 650 | Final calibration level 660 |
|---|---|---|---|---|---|---|
| Object position accuracy (per vehicle sensor) 665 | 0.5% | 0.5% | 1% | 1% | 1.5% | 1% |
| Vehicle speed accuracy per GPS 670 | 0.5% | 0.5% | 1% | 1% | 1.5% | 1% |
| GPS delay 680 | 1 ms | 3 ms | 3 ms | 5 ms | 5 ms | 5 ms |
| Brake Delay 685 | 1 ms | 3 ms | 3 ms | 5 ms | 5 ms | 5 ms |
| Delay in vehicle communication 690 | 1 ms | 3 ms | 3 ms | 5 ms | 5 ms | 5 ms |
| Intersection sensor – position measuring accuracy 695 | 0.5% | 0.5% | 1% | 1% | 1.5% | 1% |

SYSTEM AND METHODOLOGY FOR PERFORMANCE VERIFICATION OF MULTI-AGENT AUTONOMOUS ROBOTIC SYSTEMS

TECHNOLOGICAL FIELD

The presently disclosed subject matter relates to the field of autonomous vehicles, and more particularly algorithms for control of autonomous vehicles.

BACKGROUND

The appearance of Autonomous Vehicles (AV) on public roads is promised to be a reality in the near future, but some aspects of this reality are yet to be resolved. One of these is the lack of efficient Safety and Performance Verification techniques, as existing tools for hardware and software reliability and safety engineering do not provide a comprehensive solution regarding algorithms that are based on Artificial Intelligence (AI) and Machine Learning.

"Verification of Safety for Autonomous Unmanned Ground Vehicles", Daniel Meltz and Hugo Guterman, 2014 IEEE 28th Convention of Electrical and Electronics Engineers in Israel, discloses limitations of the existing reliability and safety engineering tools in dealing with autonomous systems and proposes a methodology based on statistical testing in a simulated environment.

"RobIL—Israeli Program for Research and Development of Autonomous UCV: Performance Evaluation Methodology", Daniel Meltz and Hugo Guterman, 2016 ISCEE International Conference on the Science of Electrical Engineering, discloses the RobIL program in the field of robotics. It deals with the lack of an efficient Safety Performance Verification technique. A methodology that is based on statistical testing in a simulated environment is presented.

SUMMARY OF THE INVENTION

In accordance with an aspect of the presently disclosed subject matter, there is provided a computerized method of performing safety and functional verification of algorithms for control of autonomous vehicles, comprising:
  iteratively performing an adjustment, the adjustment comprising at least one of the following:
    i) updating the value of at least one parameter indicative of at least one of noise and delay in at least one simulated sensor, associated with a computerized simulation framework corresponding to at least one simulated autonomous vehicle and to at least one operational environment, by increasing the at least one of noise and delay, and
    ii) updating the value of at least one parameter indicative of at least one of noise and delay in a response of the at least one simulated autonomous vehicle to at least one command, by increasing the at least one of noise and delay until obtaining from the computerized simulation framework an increased-severity computerized simulation framework.
  wherein the increased-severity computerized simulation framework meets a criterion that can be utilized for at least one of statistical safety verification and statistical functional performance verification of the at least one algorithm.
In accordance with an embodiment of the presently disclosed subject matter, there is further provided a method, wherein the iterative performing of an adjustment comprises:

(a) providing at least one algorithm for control of at least one autonomous vehicle;
(b) providing the computerized simulation framework, wherein the computerized simulation framework interacts with the at least one algorithm, by at least providing simulated sensor data to the algorithm and receiving commands from the algorithm, the computerized simulation framework including the at least one parameter indicative of at least one of noise and delay in the at least one simulated sensor, the computerized simulation framework including the at least one parameter indicative of at least one of noise and delay in the response of the at least one simulated autonomous vehicle to the least one command.
(c) providing at least one set of parameters of the computerized simulation framework indicative of navigation scenarios;
(d) providing at least one set of calibration criteria indicative of at least one of algorithm performance requirements and algorithm safety requirements;
(e) providing at least one set of statistical calibration criteria indicative of the at least one set of calibration criteria;
(f) performing the updating of said step (i) and the updating of said step (ii), wherein the values of the at least one parameter indicative of at least one of noise and delay in at least one sensor and of the at least one parameter indicative of at least one of noise and delay in a response of the at least one autonomous vehicle after the updating constituting a current set of noise and delay values;
(g) generating a statistically significant number of calibration scenarios, based on at least one set of parameters of the computerized simulation framework indicative of navigation scenarios;
(h) running the statistically significant number of calibration scenarios in the computerized simulation framework, based on the current set of noise and delay values, thereby generating first results;
(i) determining whether the first results meet the at least one set of statistical calibration criteria;
j) in response to the first results meeting the at least one set of statistical calibration criteria, setting the current values of the at least one parameter indicative of at least one of noise and delay in at least one sensor and of the at least one parameter indicative of at least one of noise and delay in a response of the at least one autonomous vehicle to constitute a previous set of noise and delay values, and recording the previous set of noise and delay values in a list of previous sets of noise and delay values;
(k) repeatedly performing steps (f) to (j) until the first results do not meet the at least one set of statistical calibration criteria;
(l) setting the current set of noise and delay values to constitute a failed set of noise and delay values; and
(m) selecting a set of noise and delay values, which is less noisy than the failed set of noise and delay values, and setting the selected set of noise and delay values to constitute the current set of noise and delay values, wherein the increased-severity computerized simulation framework is based on the computerized simulation framework and on the current set of noise and delay values; and wherein the criterion that can be utilized for at least one of statistical safety verification and statistical functional performance verification is whether the first results meet the at least one set of statistical calibration criteria.

In accordance with an embodiment of the presently disclosed subject matter, there is further provided a method, wherein the statistically significant number of calibration scenarios is significantly smaller than a statistically significant number of algorithm verification test scenarios.

In accordance with an embodiment of the presently disclosed subject matter, there is yet further provided a method, wherein the selecting a set of noise and delay values comprises selecting, from the list of previous sets of noise and delay values, one of the previous sets of noise and delay values.

In accordance with an embodiment of the presently disclosed subject matter, there is yet further provided a method, wherein the one of the previous sets of noise and delay values comprises a then-current previous set of noise and delay values.

In accordance with an embodiment of the presently disclosed subject matter, there is yet further provided a method, wherein the at least one command is an actuator command.

In accordance with an embodiment of the presently disclosed subject matter, there is yet further provided a method, wherein the at least one sensor is a sensor associated with the vehicle.

In accordance with an embodiment of the presently disclosed subject matter, there is yet further provided a method, wherein the at least one sensor is a fixed sensor.

In accordance with an embodiment of the presently disclosed subject matter, there is yet further provided a method, wherein the statistically significant number of calibration scenarios are pseudo-random calibration scenarios.

In accordance with an embodiment of the presently disclosed subject matter, there is yet further provided a method, further comprising:
(n) providing at least one set of criteria indicative of algorithm performance requirements and of algorithm safety requirements, constituting at least one set of algorithm verification test criteria;
(o) providing at least one set of statistical verification criteria, indicative of the at least one set of algorithm verification test criteria;
(p) generating the statistically significant number of algorithm verification test scenarios, based on the at least one set of parameters of the computerized simulation framework indicative of navigation scenarios, the statistically significant number of algorithm verification test scenarios constituting an algorithm verification scenarios set;
(q) running the algorithm verification scenario set on the computerized simulation framework, thereby generating a set of second results;
(r) determining whether the second results meet the at least one set of statistical verification criteria;
(s) in response to the second results meeting the at least one set of statistical verification criteria, generating a report indicating compliance of the at least one algorithm to the at least one set of statistical verification criteria;
(t) in response to the second results not meeting the at least one set of statistical verification criteria, generating a report indicating possible non-compliance of the at least one algorithm to the at least one set of statistical verification criteria.

In accordance with an embodiment of the presently disclosed subject matter, there is yet further provided a method, wherein at least one of the first results and the second results serving as inputs to machine learning in updating of the algorithm.

In accordance with an embodiment of the presently disclosed subject matter, there is yet further provided a method, further comprising:
(u) responsive to determining that at least one second result in the set of second results does not meet the at least one set of algorithm verification test criteria, selecting the at least one second result in the set of second results that does not meet the at least one set of algorithm verification test criteria;
(v) selecting a statistically significant number of second results in the set of second results that meet the at least one set of algorithm verification test criteria;
(w) setting the statistically significant number of second results that meet the at least one set of algorithm verification test criteria, and the at least one second result in the set of second results that does not meet the at least one set of algorithm verification test criteria, to constitute third results;
(x) replaying the third results on a replaying system;
(y) determining whether the third results meet at least one test validity criterion;
(z) in response to determining that the third results meet the at least one test validity criterion, generating a report indicating validity of the set of second results;
(aa) in response to determining that the third results do not meet the at least one test validity criterion, generating a report indicating non-validity of the set of second results.

In accordance with an embodiment of the presently disclosed subject matter, there is yet further provided a method, wherein the replaying system comprises a graphical interface.

In accordance with an embodiment of the presently disclosed subject matter, there is yet further provided a method, wherein the replaying of the third results is usable in an algorithm development process.

In accordance with an embodiment of the presently disclosed subject matter, there is yet further provided a method, further comprising:
(bb) generating a statistically significant number of external-verification scenarios, the statistically significant number of external-verification scenarios constituting an external-verification scenario set;
(cc) performing external-verification tests that correspond to the external-verification scenario set, generating fourth results;
(dd) performing a statistical analysis of the fourth results and the second results;
(ee) determining whether the fourth results and the second results meet at least one external-verification test validity criterion; and
(ff) generating a report of the determination.

In accordance with an embodiment of the presently disclosed subject matter, there is yet further provided a method, wherein the statistical analysis of the fourth results and the second results is a statistical hypothesis analysis.

In accordance with an embodiment of the presently disclosed subject matter, there is yet further provided a method, wherein the statistically significant number of external-verification scenarios is at least 10.

In accordance with an embodiment of the presently disclosed subject matter, there is yet further provided a method, wherein the statistically significant number of second results is at least 10.

In accordance with an embodiment of the presently disclosed subject matter, there is yet further provided a method, wherein the statistically significant number of algorithm verification test scenarios is at least 20.

In accordance with an embodiment of the presently disclosed subject matter, there is yet further provided a method, wherein the statistically significant number of calibration scenarios is at least 10.

In accordance with an embodiment of the presently disclosed subject matter, there is yet further provided a method, wherein the method is usable for certification testing of the algorithm.

In accordance with an embodiment of the presently disclosed subject matter, there is yet further provided a method, wherein the computerized simulation framework comprises at least one parameter indicative of at least one of noise and delay in communications between the at least one simulated autonomous vehicle and at least one management system.

In accordance with an embodiment of the presently disclosed subject matter, there is yet further provided a method, wherein the computerized simulation framework includes at least one parameter indicative of at least one of noise and delay in communications between the at least one simulated autonomous vehicle and at least one other simulated autonomous vehicle.

In accordance with an embodiment of the presently disclosed subject matter, there is yet further provided a method, wherein the at least one simulated autonomous vehicle comprises at least 2 vehicles.

In accordance with an embodiment of the presently disclosed subject matter, there is yet further provided a method, wherein the at least one simulated autonomous vehicle comprises at least 100 vehicles.

In accordance with an embodiment of the presently disclosed subject matter, there is yet further provided a method, wherein the at least one simulated autonomous vehicle comprises at least 1,000 vehicles.

In accordance with an embodiment of the presently disclosed subject matter, there is yet further provided a method, wherein the at least one simulated autonomous vehicle comprises at least 10,000 vehicles.

In accordance with an embodiment of the presently disclosed subject matter, there is yet further provided a method, wherein the at least one simulated autonomous vehicle is least one of a ground vehicle, a waterborne vehicle and an aircraft.

In accordance with an embodiment of the presently disclosed subject matter, there is yet further provided a method, wherein the ground vehicle is at least one of a private automobile, a taxi, a limousine, a bus and a truck.

In accordance with an aspect of the presently disclosed subject matter, there is yet further provided a non-transitory program storage device readable by a computer tangibly embodying computer readable instructions executable by the computer to perform a method; the method comprising: iteratively performing an adjustment, the adjustment comprising at least one of the following:

i) updating the value of at least one parameter indicative of at least one of noise and delay in at least one simulated sensor, associated with a computerized simulation framework corresponding to at least one simulated autonomous vehicle and to at least one operational environment, by increasing the at least one of noise and delay, and ii) updating the value of at least one parameter indicative of at least one of noise and delay in a response of the at least one simulated autonomous vehicle to at least one command, by increasing the at least one of noise and delay until obtaining from the computerized simulation framework an increased—severity computerized simulation framework, wherein the increased-severity computerized simulation framework meets a criterion that can be utilized for at least one of statistical safety verification and statistical functional performance verification of the at least one algorithm.

In accordance with an embodiment of the presently disclosed subject matter, there is yet further provided a non-transitory program storage device, wherein the iterative performing of an adjustment comprises:

(a) providing at least one algorithm for control of at least one autonomous vehicle;

(b) providing the computerized simulation framework, wherein the computerized simulation framework interacts with the at least one algorithm, by at least providing simulated sensor data to the algorithm and receiving commands from the algorithm, the computerized simulation framework including the at least one parameter indicative of at least one of noise and delay in the at least one simulated sensor, the computerized simulation framework including the at least one parameter indicative of at least one of noise and delay in the response of the at least one simulated autonomous vehicle to the least one command, (c) providing at least one set of parameters of the computerized simulation framework indicative of navigation scenarios;

(d) providing at least one set of calibration criteria indicative of at least one of algorithm performance requirements and algorithm safety requirements;

(e) providing at least one set of statistical calibration criteria indicative of the at least one set of calibration criteria;

(f) performing the updating of said step (i) and the updating of said step (ii), wherein the values of the at least one parameter indicative of at least one of noise and delay in at least one sensor and of the at least one parameter indicative of at least one of noise and delay in a response of the at least one autonomous vehicle after the updating constituting a current set of noise and delay values;

(g) generating a statistically significant number of calibration scenarios, based on at least one set of parameters of the computerized simulation framework indicative of navigation scenarios;

(h) running the statistically significant number of calibration scenarios in the computerized simulation framework, based on the current set of noise and delay values, thereby generating first results;

(i) determining whether the first results meet the at least one set of statistical calibration criteria;

(j) in response to the first results meeting the at least one set of statistical calibration criteria, setting the current values of the at least one parameter indicative of at least one of noise and delay in at least one sensor and of the at least one parameter indicative of at least one of noise and delay in a response of the at least one autonomous vehicle to constitute a previous set of noise and delay values, and recording the previous set of noise and delay values in a list of previous sets of noise and delay values;

(k) repeatedly performing steps (f) to (j) until the first results do not meet the at least one set of statistical calibration criteria;

(l) setting the current set of noise and delay values to constitute a failed set of noise and delay values; and (m) selecting a set of noise and delay values, which is less noisy than the failed set of noise and delay values, and setting the selected set of noise and delay values to constitute the current set of noise and delay values; wherein the increased-severity computerized simulation framework is based on the computerized simulation framework and on the current set of noise and delay values; and wherein the criterion that can be utilized for at least one of statistical safety verification and statistical functional performance verification is whether the first results meet the at least one set of statistical calibration criteria.

In accordance with an embodiment of the presently disclosed subject matter, there is yet further provided a non-transitory program storage device, further configured to:

(n) provide at least one set of criteria indicative of algorithm performance requirements and of algorithm safety requirements, constituting at least one set of algorithm verification test criteria;

(o) provide at least one set of statistical verification criteria, indicative of the at least one set of algorithm verification test criteria;

(p) generate the statistically significant number of algorithm verification test scenarios, based on the at least one set of parameters of the computerized simulation framework indicative of navigation scenarios, the statistically significant number of algorithm verification test scenarios constituting an algorithm verification scenarios set;

(q) run the algorithm verification scenario set on the computerized simulation framework, thereby generating a set of second results;

(r) determine whether the second results meet the at least one set of statistical verification criteria;

(s) in response to the second results meeting the at least one set of statistical verification criteria, generate a report indicating compliance of the at least one algorithm to the at least one set of statistical verification criteria;

(t) in response to the second results not meeting the at least one set of statistical verification criteria, generate a report indicating possible non-compliance of the at least one algorithm to the at least one set of statistical verification criteria.

In accordance with an embodiment of the presently disclosed subject matter, there is yet further provided a non-transitory program storage device, further configured to:

(u) responsive to determining that at least one second result in the set of second results does not meet the at least one set of algorithm verification test criteria, select the at least one second result in the set of second results that does not meet the at least one set of algorithm verification test criteria;

(v) select a statistically significant number of second results in the set of second results that meet the at least one set of algorithm verification test criteria;

(w) set the statistically significant number of second results that meet the at least one set of algorithm verification test criteria, and the at least one second result in the set of second results that does not meet the at least one set of algorithm verification test criteria, to constitute third results;

(x) replay the third results on a replaying system;

(y) determine whether the third results meet at least one test validity criterion;

(z) in response to determining that the third results meet the at least one test validity criterion, generate a report indicating validity of the of the set of second results;

(aa) in response to determining that the third results do not meet the at least one test validity criterion, generate a report indicating non-validity of the set of second results.

In accordance with an aspect of the presently disclosed subject matter, there is yet further provided a system configured for performing safety and functional verification of algorithms for control of autonomous vehicles, comprising a processing circuitry and configured to: iteratively perform an adjustment, the adjustment comprising at least one of the following:

i) updating the value of at least one parameter indicative of at least one of noise and delay in at least one simulated sensor, associated with a computerized simulation framework corresponding to at least one simulated autonomous vehicle and to at least one operational environment, by increasing the at least one of noise and delay, and ii) updating the value of at least one parameter indicative of at least one of noise and delay in a response of the at least one simulated autonomous vehicle to at least one command, by increasing the at least one of noise and delay until obtaining from the computerized simulation framework an increased-severity computerized simulation framework, wherein the increased-severity computerized simulation framework meets a criterion that can be utilized for at least one of statistical safety verification and statistical functional performance verification of the at least one algorithm.

In accordance with an embodiment of the presently disclosed subject matter, there is yet further provided a system, wherein the iterative performing of an adjustment comprises:

(bb) providing at least one algorithm for control of at least one autonomous vehicle;

(cc) providing the computerized simulation framework, wherein the computerized simulation framework interacts with the at least one algorithm, by at least providing simulated sensor data to the algorithm and receiving commands from the algorithm, the computerized simulation framework including the at least one parameter indicative of at least one of noise and delay in the at least one simulated sensor, the computerized simulation framework including the at least one parameter indicative of at least one of noise and delay in the response of the at least one simulated autonomous vehicle to the least one command, (dd) providing at least one set of parameters of the computerized simulation framework indicative of navigation scenarios;

(ee) providing at least one set of calibration criteria indicative of at least one of algorithm performance requirements and algorithm safety requirements;

(ff) providing at least one set of statistical calibration criteria indicative of the at least one set of calibration criteria;

(gg) performing the updating of said step (i) and the updating of said step (ii), wherein the values of the at least one parameter indicative of at least one of noise and delay in at least one sensor and of the at least one parameter indicative of at least one of noise and delay in a response of the at least one autonomous vehicle after the updating constituting a current set of noise and delay values;

(hh) generating a statistically significant number of calibration scenarios, based on at least one set of parameters of the computerized simulation framework indicative of navigation scenarios;

(ii) running the statistically significant number of calibration scenarios in the computerized simulation framework, based on the current set of noise and delay values, thereby generating first results;

(jj) determining whether the first results meet the at least one set of statistical calibration criteria;

(kk) in response to the first results meeting the at least one set of statistical calibration criteria, setting the current values of the at least one parameter indicative of at least one of noise and delay in at least one sensor and of the at least one parameter indicative of at least one of noise and delay in a response of the at least one autonomous vehicle to constitute a previous set of noise and delay values, and recording the previous set of noise and delay values in a list of previous sets of noise and delay values;

(ll) repeatedly performing steps (f) to (j) until the first results do not meet the at least one set of statistical calibration criteria;

(mm) setting the current set of noise and delay values to constitute a failed set of noise and delay values; and (nn) selecting a set of noise and delay values, which is less noisy than the failed set of noise and delay values, and setting the selected set of noise and delay values to constitute the current set of noise and delay values; wherein the increased-severity computerized simulation framework is based on the computerized simulation framework and on the current set of noise and delay values; and wherein the criterion that can be utilized for at least one of statistical safety verification and statistical functional performance verification is whether the first results meet the at least one set of statistical calibration criteria.

In accordance with an embodiment of the presently disclosed subject matter, there is yet further provided a system, further configured to:

(oo) provide at least one set of criteria indicative of algorithm performance requirements and of algorithm safety requirements, constituting at least one set of algorithm verification test criteria;

(pp) provide at least one set of statistical verification criteria, indicative of the at least one set of algorithm verification test criteria;

(qq) generate the statistically significant number of algorithm verification test scenarios, based on the at least one set of parameters of the computerized simulation framework indicative of navigation scenarios, the statistically significant number of algorithm verification test scenarios constituting an algorithm verification scenarios set;

(rr) run the algorithm verification scenario set on the computerized simulation framework, thereby generating a set of second results;

(ss) determine whether the second results meet the at least one set of statistical verification criteria;

(tt) in response to the second results meeting the at least one set of statistical verification criteria, generate a report indicating compliance of the at least one algorithm to the at least one set of statistical verification criteria;

(uu) in response to the second results not meeting the at least one set of statistical verification criteria, generate a report indicating possible non-compliance of the at least one algorithm to the at least one set of statistical verification criteria.

In accordance with an embodiment of the presently disclosed subject matter, there is yet further provided a system, further configured to:

(vv) responsive to determining that at least one second result in the set of second results does not meet the at least one set of algorithm verification test criteria, select the at least one second result in the set of second results that does not meet the at least one set of algorithm verification test criteria;

(ww) select a statistically significant number of second results in the set of second results that meet the at least one set of algorithm verification test criteria;

(xx) set the statistically significant number of second results that meet the at least one set of algorithm verification test criteria, and the at least one second result in the set of second results that does not meet the at least one set of algorithm verification test criteria, to constitute third results;

(yy) replay the third results on a replaying system;

(zz) determine whether the third results meet at least one test validity criterion;

(aaa) in response to determining that the third results meet the at least one test validity criterion, generate a report indicating validity of the set of second results;

(bbb) in response to determining that the third results do not meet the at least one test validity criterion, generate a report indicating non-validity of the set of second results.

BRIEF DESCRIPTION OF THE DRAWINGS

In order to understand the presently disclosed subject matter and to see how it can be carried out in practice, examples will now be described, by way of non-limiting example only, with reference to the accompanying drawings, in which:

FIGS. 1A and 1B illustrate a generalized example environment in which autonomous vehicles may maneuver, in accordance with certain embodiments of the presently disclosed subject matter.

FIG. 6 illustrates an example of a generalized methodology for adjusting levels of noise and delay, in accordance with certain embodiments of the presently disclosed subject matter.

DETAILED DESCRIPTION OF THE DRAWINGS

Figure 1A:
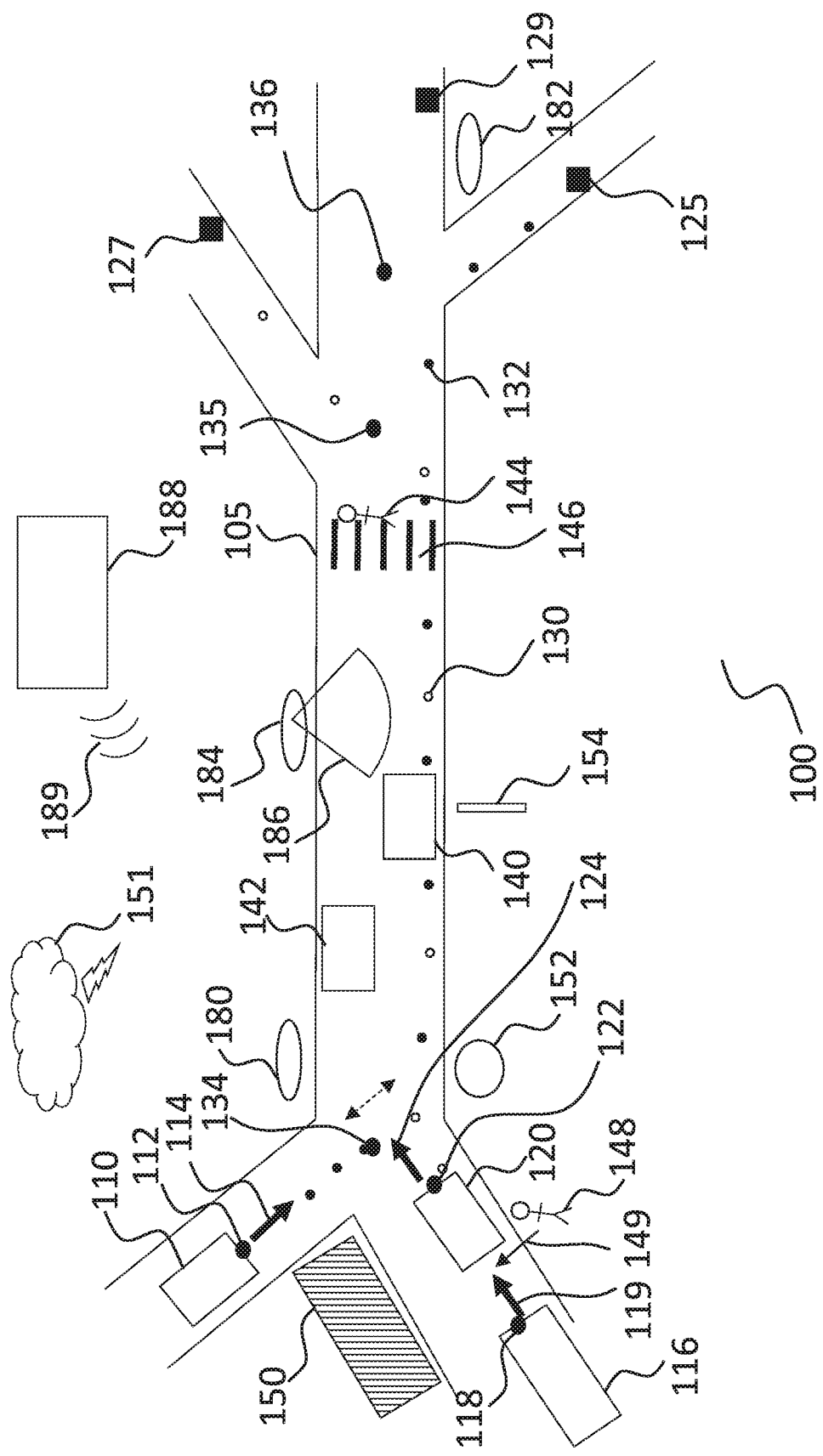

In the drawings and descriptions set forth, identical reference numerals indicate those components that are common to different embodiments or configurations.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components, circuits and protocols have not been described in detail so as not to obscure the presently disclosed subject matter.

Unless specifically stated otherwise, as apparent from the following discussions, it is appreciated that throughout the specification discussions utilizing terms such as "maneuvering" "steering", "detecting", "determining", "deciding" "instructing", "calculating", "comparing", "inspecting" "looping", "defining", "formulating", "configuring", "selecting", "setting", "updating", "storing", "retrieving", "importing", "applying", "providing", "performing", "simulating", "modeling", "receiving", "communicating", "sending", "interfacing" "interacting", "measuring", "processing", "moving", "generating", "reporting", "recording", "executing", "inputting", "outputting", "adjusting", "adding", "increasing", "creating", "generating", "running", "sampling", "verifying", "testing", "seeing", "calibrating", "controlling", "analyzing". "assessing", "evaluating", "grading", "assigning", "replaying", or the like, include action(s) and/or processes of a computer that manipulate and/or transform data into other data, said data represented as physical quantities, e.g. such as electronic or mechanical quantities, and/or said data representing the physical objects. The term "computer" should be expansively construed to cover any kind of hardware-based electronic device with data processing capabilities, including, by way of non-limiting example, a personal computer, a server, a computing system, a communication device, a processor or processing unit (e.g. digital signal processor (DSP), a microcontroller, a microprocessor, a field programmable gate array (FPGA), an application specific integrated circuit (ASTC), etc.), any other electronic computing device, including, by way of non-limiting example, the processing circuitry therein, such as for example the processing circuitry 320 (further detailed herein with regard to FIG. 3A), disclosed in the present application.

The operations in accordance with the teachings herein may be performed by a computer specially constructed for the desired purposes, or by a general-purpose computer specially configured for the desired purpose by a computer program stored in a non-transitory computer-readable storage medium.

Embodiments of the presently disclosed subject matter are not described with reference to any particular programming language. It will be appreciated that a variety of programming languages may be used to implement the teachings of the presently disclosed subject matter as described herein.

The terms "non-transitory memory" and "non-transitory storage medium" used herein should be expansively construed to cover any volatile or non-volatile computer memory suitable to the presently disclosed subject matter.

As used herein, the phrase "for example," "such as", "for instance" and variants thereof describe non-limiting embodiments of the presently disclosed subject matter. Reference in the specification to "one case", "some cases", "other cases". "one example", "some examples", "other examples" or variants thereof means that a particular described method, procedure, component, structure, feature or characteristic described in connection with the embodiment(s) is included in at least one embodiment of the presently disclosed subject matter, but not necessarily in all embodiments. The appearance of the same term does not necessarily refer to the same embodiment(s) or example(s).

Usage of conditional language, such as "may", "might", or variants thereof should be construed as conveying that one or more examples of the subject matter may include, while one or more other examples of the subject matter may not necessarily include, certain methods, procedures, components and features. Thus such conditional language is not generally intended to imply that a particular described method, procedure, component or circuit is necessarily included in all examples of the subject matter. Moreover, the usage of non-conditional language does not necessarily imply that a particular described method, procedure, component or circuit is necessarily included in all examples of the subject matter.

It is appreciated that certain embodiments, methods, procedures, components or features of the presently disclosed subject matter, which are, for clarity, described in the context of separate embodiments or examples, may also be provided in combination in a single embodiment or examples. Conversely, various embodiments, methods, procedures, components or features of the presently disclosed subject matter, which are, for brevity, described in the context of a single embodiment, may also be provided separately or in any suitable sub-combination.

It should also be noted that each of the figures herein, and the text discussion of each figure, describe one aspect of the presently disclosed subject matter in an informative manner only, by way of non-limiting example, for clarity of explanation only. It will be understood that that the teachings of the presently disclosed subject matter are not bound by what is described with reference to any of the figures or described in other documents referenced in this application.

A basic capability of Autonomous Vehicles is to follow a path while detecting and avoiding obstacles. Autonomous vehicles may be controlled by algorithms that involve perception and Reactive Path Planning (RPP). These algorithms may often rely heavily on designer experience, and may include significant use of heuristics and statistics. Following a description of an example autonomous navigation scenario and related systems, verification testing techniques will be presented.

Bearing this in mind, attention is now drawn to FIG. 1*a*, illustrating a generalized example environment 100 in which autonomous vehicles may maneuver, in accordance with certain embodiments of the presently disclosed subject matter. A very simplified non-limiting example of road network 105 is shown. This road network includes intersections 134, 135, and 136. Also shown, by way of example, are three autonomous vehicles, taxis 110 and 120, and bus 116. The position of each autonomous vehicle on the road network, at the particular moment in time depicted by FIG. 1*a*, is indicated, in a simplified fashion, as points 112, 122, and 118. The direction of movement of each autonomous vehicle network is indicated as arrows 114, 124, and 119.

In the example shown, each autonomous vehicle has a defined task, objective or mission. For example, 110 may be instructed to reach endpoint 125, 120 to reach endpoint 127, and 116 to reach endpoint 129. In some cases, not shown in the drawing, a particular mission may include more than one endpoint per vehicle, and/or may involve time constraints. e.g. "taxi 110 should pick up a customer at point A, and bring him to point B by 9 o'clock".

The control algorithm for each vehicle may define a path, composed of waypoints, which the controlled vehicle is to reach on the way to its assigned endpoint. In the example of the figure, at the moment in time depicted, taxi 110 is instructed to pass through waypoints 132 (the dark dots), while taxi 120 is to take a path that passes through waypoints 130 (light dots). For purpose of clarity, the waypoints for bus 116 to reach its endpoint 129 are not shown in the figure. Also, in some cases, the algorithm may take into consideration various other factors in defining a path, e.g. minimizing fuel usage, and minimizing any or all of sharp turns, sudden braking and sudden acceleration. Note, too, that the algorithm of a vehicle may re-calculate the path of waypoints in real time as new conditions are detected. For example, the algorithm may detect heavy traffic, and may then choose a different route of streets/roads to reach the endpoint.

The autonomous vehicles may also be referred to herein as agents. A situation where more than one such agent 110 and 120, 116 are traveling to their objectives may also be referred to herein as a multi-agent systems.

Each autonomous vehicle may have to sense and detect various conditions, which may change over time, and may have to react to these detected conditions—e.g. to slow down or speed up, to stop, to make turns, to go forward or back up, to drive around an obstacle, to calculate a new path etc. In a real-life driving scenario, there may be numerous factors to consider, some of which are described with reference to FIG. 1a, as non-limiting examples only. For example, the algorithm may have to account for various expected and unexpected moving objects, such as moving vehicle 140, pedestrian 144 crossing in crosswalk 146, or pedestrian 148 bursting 149 into the street in an unexpected manner, not in a crosswalk. Other examples, not shown, may include bicycles/motorcycles, pets and other animals, or a ball rolling into the road. The algorithm may also have to consider non-moving obstacles and hazards, such as, for example, parked vehicle 142, mud or ice or oil slicks on the road, fallen objects or other road obstacles, and trees or bushes extending into the street. (The latter hazards are not shown in the figure, for better clarity.) The vehicle algorithm may also be required to detect and follow the road 105 itself, accounting for all intersections, curves and turns, and for potholes, broken surfaces, and other road imperfections.

In addition, as the road network is three-dimensional (though not shown as such in FIG. 1a), the algorithm will have to account for elevation changes, i.e, for the topography of the road. Similarly, there may be visual blockages, e.g. building 150, that limit the possibility of a full view of the road and of its contents. The algorithm will also have to account for the weather conditions, and lighting conditions, represented in the figure as storm cloud 151. Further, to enable the vehicle to follow traffic laws, it may be required, for example, to detect and consider traffic light 152, road signs 154 and road markings (not shown). Road signs 154 may be, for example, speed limit or stop/yield signs, among numerous others. Example road markings may indicate "slow" or "school crossing" or "right turn only", or perhaps a crosswalk.

Turning now to FIG. 1b, it illustrates one generalized example of components of an autonomous vehicle maneuver control system, in accordance with certain embodiments of the presently disclosed subject matter. An autonomous vehicle such as taxi 110 may, in some example cases, comprise at least certain components to assist it in detecting its surrounding environment, in processing such data to make maneuver decisions, and to move itself. In some examples, such components may include vehicle sensors 171, enabling the autonomous vehicle to detect aspects of its surroundings, such as for example those described with regard to FIG. 1a. Vehicle sensors 171 may include, for example, RADAR 172, LIDAR 176, visual and/or thermal imaging cameras 175, GPS 173, and INS 174. The vehicle may also comprise vehicle actuators 179, to control its movement. Some example actuators include accelerator 176, brakes 177, and steering mechanisms 178. Communications 170 may allow communication with other components of an autonomous vehicle maneuver control system, discussed further herein. Processing 172 may include processors, computers and/or memory, that enable control of all of the components, and enable decisions that are defined as the responsibility of the autonomous vehicle. For example, the control algorithm may run on processing 172. Such an algorithm may perform, among other functions, implementation of the vehicle's assigned path, while following traffic laws, as well as dealing in a safe way with the developing situation on the road (e.g. appearance of obstacles). As will be discussed further herein, some or all of these components may not function in a perfect manner in the real world, and may have noise and or delays associated with them.

Reverting now to FIG. 1a, it should be noted that in real-life travel of multiple autonomous vehicles, in many cases each such vehicle will not make maneuver decisions based only on what its own sensors 171 detect. As depicted in FIG. 1a, an autonomous vehicle maneuver control system may in some cases include one or more management systems 188. Management system 188 may communicate 189 with some or all of the autonomous vehicles via the vehicles' communications 170. Autonomous vehicles 110, 120 may also be capable of communicating information to each other. Note that in some cases there may both communication between autonomous vehicles and themselves, and between autonomous vehicles and management system 188. An autonomous vehicle maneuver control system may also include fixed (static) sensors 184, placed at various locations along the road network, monitoring 186 a portion of the road network. Other fixed sensors 180, 182 may monitor intersections 134, 135, 136. Such monitoring may supplement the detection provided by the vehicle sensors 171 of each autonomous vehicle. The combination of the management system(s), fixed sensors and communications to multiple autonomous vehicles may in some cases provide the algorithm of each autonomous vehicle with a richer picture of the environment in which it is traveling. It should be noted, that in some cases such communication systems are not needed in the trivial case where only one autonomous vehicle is traveling in a region, and thus no coordination between agents is needed.

In some example cases, the management system 188 may have the task of determining optimal objectives for each agent, and optimal paths for each agent, as well as updating these based on information it receives from both the fixed sensors and the agents. These optimizations may take into consideration the need to keep each agent a safe distance from each other. It may communicate these paths to each autonomous vehicle. In some example cases, each autonomous vehicle 110, 116, 120 is responsible for implementing its assigned path, while keeping within the speed limits defined for the vehicle, and dealing with real-time developments on the road, such as obstacles. In some examples, one management system may control all autonomous vehicles. In some examples, each type of autonomous vehicle, or each fleet of such vehicles, may have its own management system.

Reverting now to FIG. 1b, a management system 188 may, in some example cases, comprise at least certain components to assist it in communicating with other system components, and in processing data to make decisions. Processing 165 may include processors, computers and/or memory, that enable actions that may be defined as the responsibility of the management system. Example responsibilities of the management system 188 may include: assigning specific agents to specific tasks, defining paths per agent, and optimization of the paths in real time based on updated data received from the agents and the static/fixed sensors. Communications 167 may allow communication with other components of an autonomous vehicle maneuver control system, thus for example receiving data based on input from vehicles and fixed sensors and sending commands to autonomous vehicles, e.g. containing a new task/mission or a new or modified path of waypoints.

A fixed sensor 180 may, in some example cases, comprise at least certain components to assist it in sensing its surroundings and in communicating with other system components. Sensors 166 may include, for example, cameras, LIDAR and RADAR. Communications 168 may allow communication with, for example, the management system 188. As will be discussed further herein, some or all of the components of management system 188, and of fixed sensors 180, may not function in a perfect manner in the real world, and may have noise and or delays associated with them.

It should be noted that FIG. 1a discloses an extremely simplified road network, with a minimum number of roads, intersections, vehicles, hazards etc., with only two types of autonomous vehicles, presented simply to point out basic concepts in a clear fashion. In real-life, a large city or region may have hundreds or more of streets, roads, traffic signals and fixed sensors, as well as thousands, if not more, vehicles (autonomous and other), pedestrians and obstacles/hazards. Similarly, FIG. 1b shows only a small sub-set of components that would exist in real systems. It should also be noted that ground vehicles (e.g. taxis, limousines, buses, trucks, private automobiles) traveling on streets and roads has been shown, only for simplicity of exposition. However, these concepts may also be applicable to autonomous movement of off-road ground vehicles such as tractors travelling across fields of crops and ATVs travelling along off-road trails. Similarly, the same concepts of e.g. autonomous movement of multiple vehicles in communication with management systems, to reach assigned endpoints while in the presence of obstacles and hazards, as discussed in the presently disclosed subject matter, may be applicable as well to waterborne vehicles or craft such as boats or ships, and aircraft such as airplanes, and the like. As one non-limiting example, control of one or more autonomous waterborne vehicles may have to consider the changing depths of the water along the route, the outline of the shore, and locations of rocks, defined lanes of travel, other watercraft, weather and water conditions (waves, current etc.).

An important question to be answered, in designing algorithms to control autonomous vehicles, and in verifying their appropriateness for deployment, may be phrased as: "To what degree can these algorithms be trusted—particularly in safety-related tasks like collision avoidance?" An important question in safety analysis is: "given certain working conditions, what is the probability of a technical mishap that may cause a disastrous result?" A control algorithm must be robust—safe and sufficiently-performing in all situations. In some cases, the requirement may be that the probability of a "fatal mishap" under normal working conditions will be no more than one in a million, with confidence level higher than 95%. A review of some existing algorithm verification techniques, and of some of their shortcomings, is outlined in the articles "Verification of Safety for Autonomous Unmanned Ground Vehicles", Daniel Meltz and Hugo Guterman, 2014 IEEE 28th Convention of Electrical and Electronics Engineers in Israel, and "RobIL—Israeli Program for Research and Development of Autonomous UGV: Performance Evaluation Methodology", Daniel Meltz and Hugo Guterman, 2016 ISCEE International Conference on the Science of Electrical Engineering.

As one example of an existing technique, collecting needed statistical data in a "brute force" approach, by driving large fleets of thousands of autonomous vehicles, monitored by safety drivers, on public streets and roads in numerous cities over millions of kilometers, would be a very costly method to test even one algorithm, possibly prohibitively so. As already described with regard to FIG. 1a, there is a large number of perimeter values, of a very large number of parameters, that would have to be tested in order to verify the functional and safety performance of an algorithm in all conditions in which it may have to operate. The expense of such a method is more evident when it is taken into account that sometimes corrections in the algorithm are needed, and as a result substantial retesting is unavoidable. In addition, such testing may fail to verify correct behavior in critical situations, such as the appearance of a soccer ball bouncing on the road near a children's playground. In such situations, the driver's instinct to ensure safety is likely to take precedence, and he or she would immediately act on their own and not rely on the system's response. On the other hand, allowing deployment of an autonomous vehicle algorithm following insufficient testing may pose unacceptable safety risks to the public, as well as possibly resulting in vehicles that function in a way that neither meets the needs of drivers, nor of the public (e.g. the vehicle drives too slowly so as to avoid possible crashes, thus causing traffic jams, or the vehicle misses turns etc.).

A methodology that is based on statistical testing, e.g. in a Monte Carlo manner, in a simulated environment, may have advantages over some other verification techniques. Such a methodology may generate an estimation of the probability of a fatal mishap of an autonomous vehicle navigation and control algorithm, which will be referred to here as the Algorithm Under Test (AUT). Such a statistical verification testing methodology using computer simulations may provide a statistically valid set of verification test results in cases where real-life driving tests monitored by human operators may not be able to do so. The methodology may be used to supplement existing techniques of hardware and software safety verification. Because testing is done in a simulated environment, known in some examples as a computerized simulation framework, methods to account for inaccuracies in the simulation, such as calibration of noise and delay, may be advantageous, as will be described further herein. It may be that in some cases, that, given financial constraints and the inherent limitations of other verification mechanisms, the use of statistical verification testing of simulations, that include effective calibration of noise and delay, may be the difference between being able to verify the safety and/or functional performance of AUT to an acceptable degree, and not being able to do so.

Figure 2:
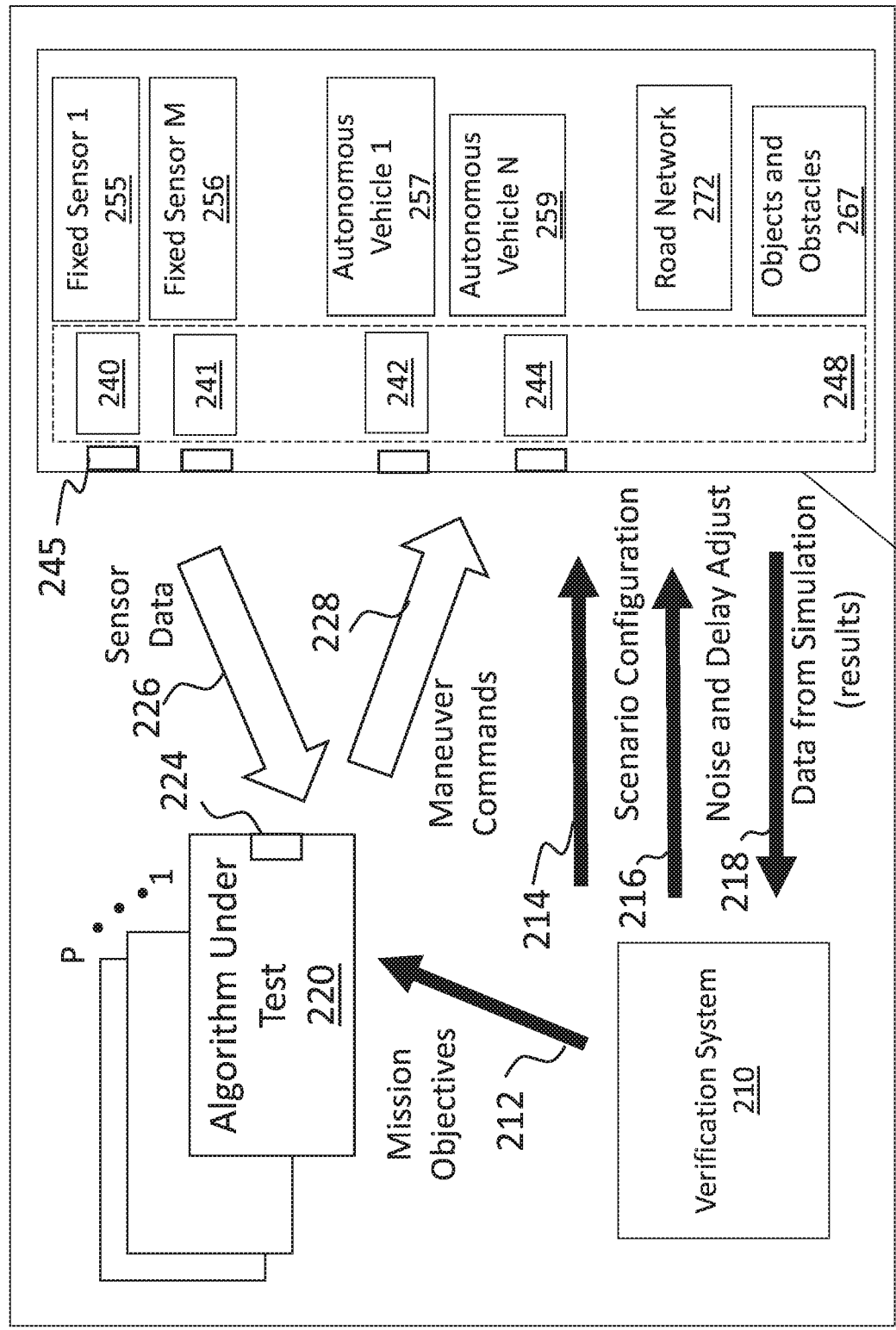
FIG. 2 illustrates a generalized example of components of an architecture for statistical testing of an autonomous vehicle navigation and control algorithm, in accordance with certain embodiments of the presently disclosed subject matter.

Turning now to FIG. 2, it illustrates one generalized example of components of an architecture for statistical testing of an autonomous vehicle navigation and control algorithm, in accordance with certain embodiments of the presently disclosed subject matter. A computerized simulation framework270 of the simulated environment may include a computerized model, or models, of the simulated environment in which the vehicles move, of the simulated vehicles and/or of the simulated sensors. It may contain computer software simulation models of numerous fixed sensors numbered 1 to M, 255, 256. These may correspond, for example, to real-life fixed sensors 180, 182, 184. The simulation framework 270 may also contain computer software models of autonomous vehicles numbered 1 to N, 257, 259. These may correspond, for example, to real-life autonomous vehicles 110, 116, 120. Note that simulated autonomous vehicles 257, 259 may include, in some cases, both simulation models of the vehicles, as well as simulation models of sensors of each vehicle. Note also that simulation models of the vehicles may in some cases also include simulation of their communication to other autonomous vehicles and to management system 188.

The simulation framework 270 may also include a computer software of a road network 272 of, for example, a city, cities, region or country, which may correspond to real-life road network and intersections 105, 134, 135, 136. The simulation framework 270 may also include a software model 267 of various objects and obstacles, which may correspond to real-life vehicles, pedestrians and obstacles 140, 142, 144, 148, 150, among numerous others, as well as possibly including light and weather conditions 151.

The architecture may also include the Algorithm Under Test (AUT) 220, as well as the verification system 210 used to verify the AUT. Note that there may be more than one AUT in the testing architecture, numbered 1 to P. For example, verification testing may be performed simultaneously on AUT #1 for a taxi, AUT #2 for a different model of taxi, and AUT #3 for a particular model of bus. Thus, wherever AUT or Algorithm Under Test is referred to herein, it may refer to multiple AUTs.

Note also that, in the example of FIG. 2, the Verification System 210, AUT 220 and computerized simulation framework 270 may reside on separate computer systems. This is one non-limiting example implementation. In such a case, they may be connected by cables to physical connector ports on each system (not shown). These physical connections and interfaces may be the same ones used to connect to, for example, specific real-life sensors. In such cases, there may be interface modules 224, 245, running the interface protocol as described in an Interface Connection Document (ICD), and running pre-processors that convert the connector interface protocol to the internal protocol of the AUT. For example, such an architecture may allow the AUT to interface with a particular sensor using the actual physical connection relevant to that sensor, and to experience all of the noises and delays typical of that interface. In other examples, such as shown in FIG. 3b further herein, one or both of 220 and 270 may be located on Verification System 210. In a case such as shown in FIG. 3b, where physical cables are not used to simulate connection to a particular piece of hardware, or to any hardware, the computerized simulation framework 270 may also include software modeling of the relevant ICD and pre-processors.

FIG. 2 also shows example interactions between components of the testing architecture. Verification system 210 may be configured to define a particular test scenario by sending scenario configuration information 214 to the simulation framework 270. For example, it may configure the number N and type of autonomous vehicles 257, 259, the layout and characteristics of the road network 272, etc. System 210 may be configured to send to the AUT 220 mission objectives 212, e.g. endpoints for each simulated autonomous vehicle within the computer simulation (corresponding e.g. to real life endpoints 125, 127, 129). Once testing has begun, the simulation framework 270 and the AUTs may begin to interact, in a fashion similar to that in which the real world environiment 100 interacts with the AUTs.

For example, the model fixed 255 and vehicle 257 sensors within the model 270 may send simulated sensor data 226, corresponding for example to data from real life sensors 166, 171 to the AUTs 220, while the AUTs may issue maneuver commands 228 to the modelled autonomous vehicles 257, 259 within the simulation framework 270, corresponding for example to commands issued to real-life vehicle actuators 179. The model 270 receives these commands. As virtual time progresses, and vehicles and objects "move" and interact within the computerized simulation framework 270, various data 218 from the simulation may be sent by framework 270 to verification system 210. System 210 may be configured to received such data. Such data may include simulation results (e.g. vehicle #9 reached its endpoint at time T while travelling at average speed S, vehicle #53 crashed into object #24).

The foregoing description of the testing architecture has assumed ideal behavior by all components (e.g. sensors, vehicles) of the framework 270. In the real world, however, behavior is not ideal. For example, there may be delays in acquisition by a sensor of data, and in its communication to other components or systems. Similarly, there may be delays in implementation of a command from the AUT in physical components of the autonomous vehicle, such as vehicle actuators 179, that is in the response of the autonomous vehicle. One simple example is that when turning a steering wheel, the vehicle does not respond immediately in making the full desired turn. Similarly, there is noise both in sensors (e.g. a camera recorded an image with some blur), and in response of the autonomous vehicle to comnands (e.g. Steering command C was performed as if it was varying in the range of ±10% around S). Vehicle 110 may thus, for example, erroneously report that it is currently in intersection 134, when in fact it is 30 meters away. Another example of noise in the system may be malfunction of a particular sensor or vehicle actuator (e.g. DGPS sensor might stop reporting location, or report with a very high "out of bounds" error as a result of the "multipath" effect: steering might become very unstable and noisy, as a result of a flat tire.) These sources of inaccuracy may be modelled within the computerized simulation framework 270 as noise and delay controls 240, 241, 242, 244, associated in some cases with each sensor and autonomous vehicle 255, 256, 257, 259. These controls may also be referred to as disruptors. These individual disruptors may be referred to herein, in aggregate, as disruptors 248 (shown as a broken line). They may be parameters indicative of noise and/or of delay in sensors and/or in response to commands from the AUT, and/or in communications between components such as simulated autonomous vehicles and management systems.

The verification system 210 may be configured to send commands or data 216 to adjust the noise and delay levels of various parameters associated with various components of the framework 270. As discussed further herein, such adjustments may serve to improve the statistical verification process, by making the conditions under which the simulated framework works, more severe than is typical in real-life, thereby in some cases accounting for at least some of the unavoidable modeling inaccuracies.

Figure 3A:
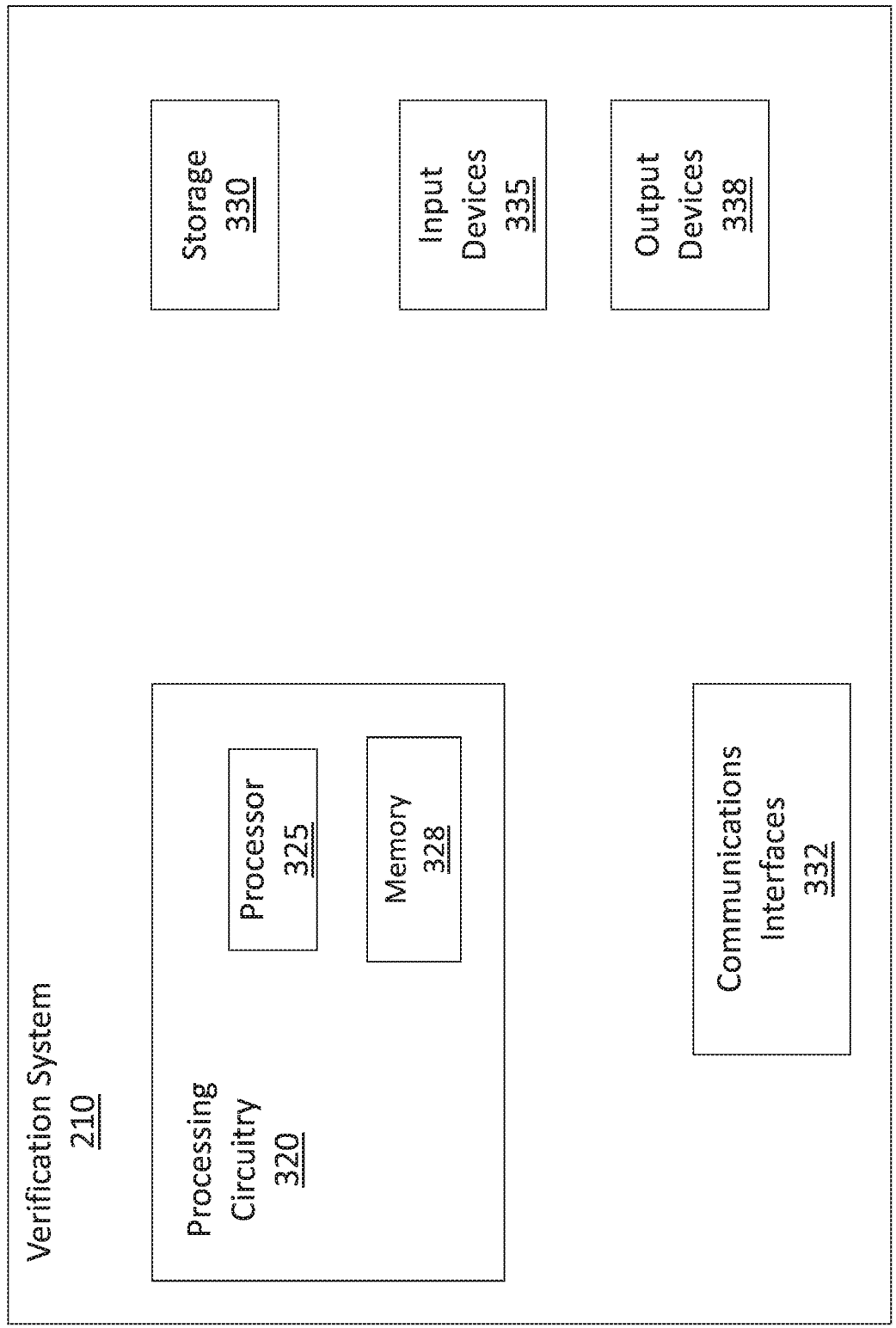
FIGS. 3A to 3B are generalized block diagrams schematically illustrating an example verification system, in accordance with certain exemplary embodiments of the presently disclosed subject matter.
Figure 3B:
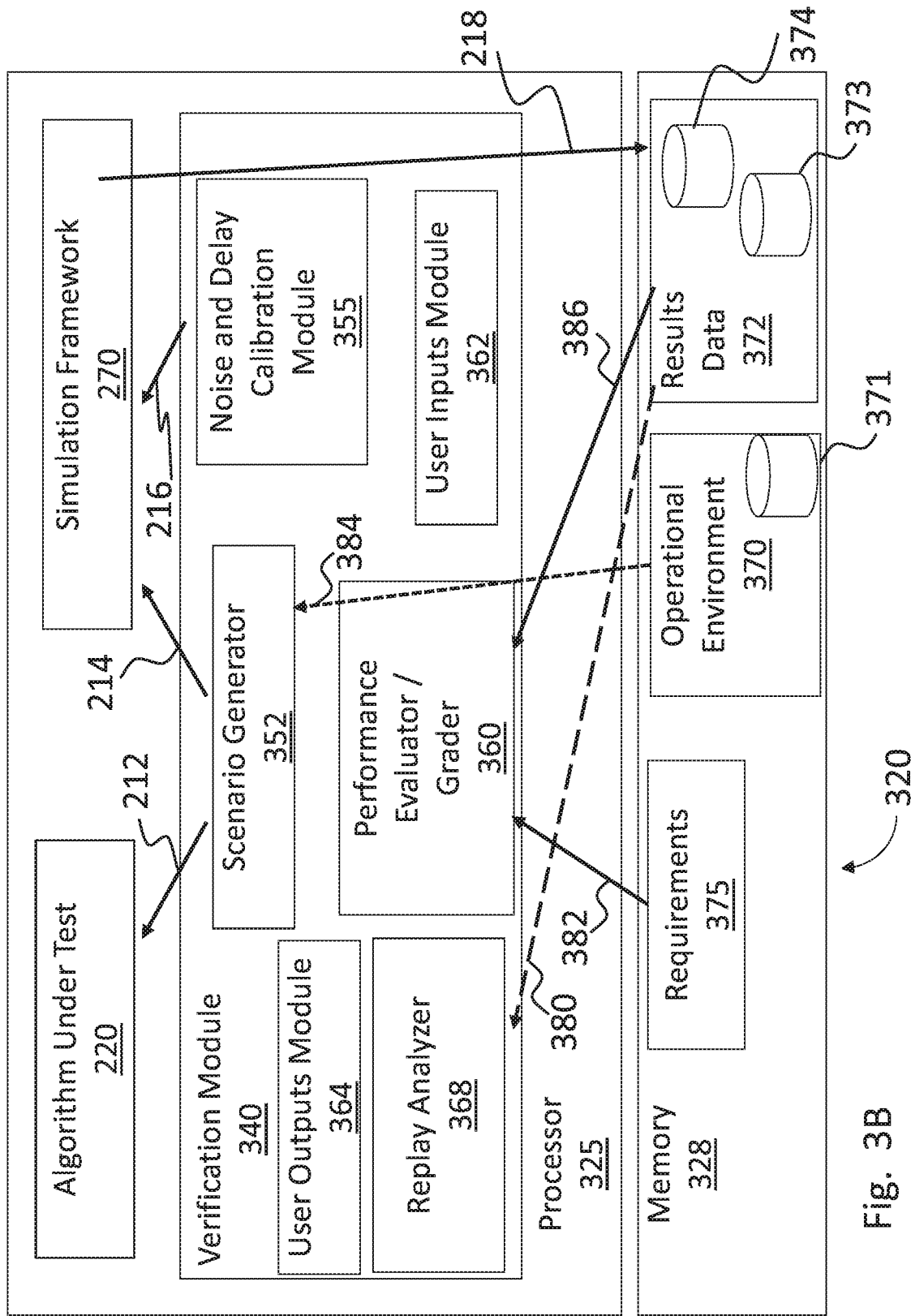

Turning to FIGS. 3A and 3B, there is now provided a description of certain examples of verification systems for autonomous vehicle algorithms.

Reference is now made to FIG. 3A, which is a generalized block diagram schematically illustrating an example verification system, in accordance with certain embodiments of the presently disclosed subject matter.

The verification system 210 may in some examples include a computer. It may, by way of non-limiting example, comprise processing circuitry 320. Processing circuitry 320 may comprise a processor 325 and memory 328.

Examples of the functions of processor 325 will be further elaborated with regard to FIG. 3B.

The processing circuitry 320 may also include, in some examples, one or more memories 328. Examples of the functions of memory 328 will be further elaborated with regard to FIG. 3B.

The processing circuitry 320 may be, in non-limiting examples, general-purpose computers specially configured for the desired purpose by a computer program stored in a non-transitory computer-readable storage medium. They may be configured to execute several functional modules in accordance with computer-readable instructions. In other non-limiting examples, processing circuitry 320 may be computers specially constructed for the desired purposes.

The verification system 210 may also include, in some examples, storage 330. Some of the functions of memory 328, elaborated with regard to FIG. 31B, may be implemented in storage 330. Depending on system design, more or less of the data storage may occur in memory 328 or in storage 330. For example, if the storage capacity is not large enough, some of the data may be stored in 330. This will be further elaborated with regard to FIG. 31B.

The verification system 210 may also include, in some examples, input devices 335. Input devices may be used, for example, to allow human users to input certain data or commands into verification system 210.

The verification system 210 may also include, in some examples, output devices 338. Output devices may be used, for example, to allow human users to receive reports from verification system 210.

The verification system 210 may also include, in some examples, communication interfaces 332. The communication interfaces may be used, for example, to allow interaction between system 210 and other components such as AUT 220 and simulation framework 270.

Reference is now made to FIG. 3B, which is a generalized block diagram which is a generalized block diagram schematically illustrating an example verification system, in accordance with certain embodiments of the presently disclosed subject matter. For purposes of clarity of exposition, the information exemplified in FIGS. 3A and 3B has been separated into two figures. FIG. 3A describes, at a high level, example components of the system. FIG. 3B describes possible sub-components of processor 325 and of memory 328, and example interactions between them.

The processor 325 may in some cases include a verification module 340, which may perform various functions related to testing the AUT.

Verification module 340 may, in some examples, include scenario generator 352. In some cases, the scenario generator may be used to calculate the required number of test scenarios, and/or to generate these scenarios. Scenario generator 352 may send mission objectives 212 to AUT 220, and scenario configuration 214 to simulation framework 270. Some examples of the functions of 352 are described further herein with reference to FIGS. 4, 5, 7.

Verification module 340 may, in some examples, include noise and delay 710 calibration module 355. In some cases, noise and delay calibration module 355 may be used to send noise and delay adjustments 216 to disruptors 248 of simulation framework 270. Some examples of the functions of 355 are described further herein with reference to FIGS. 4, 5, 6.

Verification module 340 may in some examples include performance evaluator/grader 360. Performance evaluator/grader 360 may analyze the results of various scenarios that are run, grade them, and evaluate or determine whether certain criteria and/or requirements are met. It may apply statistical methods in these evaluations. In some cases, performance evaluator/grader 360 may receive inputs 386 from memory 328, and/or from storage 330, with which it will evaluate and grade the performance. In sone cases, performance evaluator/grader 360 may receive 382 requirements 375 from memory 328. Some examples of the functions of 360 are described further herein with reference to FIGS. 4, 5, 7.

Verification module 340 may in some examples include replay analyzer 368. Examples of its functions are described further herein with reference to FIG. 8.

Verification module 340 may in some examples also include user inputs module 362, and/or user outputs module 364. These modules may interface with the input devices 335 and output devices 338, which may, in some cases, be located external to processor 325.

It should be noted that in FIG. 3B, the processor 325, a component of verification system 210, in addition to running verification module 340, which performs verification functions, runs as well as the AUT 220 and the computerized simulation framework 270. This is one possible example implementation of the test system. FIG. 2 shows another example implementation, in which AUT 220 and framework 270 are located on systems external to verification system 210. In other examples, one of the AUT 220 and the framework 270 may sit on the verification system 210, possibly running on processor 325, while the other is located on an external system. Note that in some cases, the AUT may be a "black box" provided on separate hardware by the software development company. In such cases, as well, the AUT would not reside on processor 325.

The processor 325 may make use of memory 328, to store data while performing analysis and calculations, among other uses.

Memory 328 may, in some examples, include stored requirements 375. These may be an input 382 to performance evaluator/grader 360. The memory 328 may also store the operational environment 370. This may be used as an input 384 to scenario generator 352. The operational environment 370 in turn may in some cases include GIS (Geographic Information System) database 371. The memory 328 may also store the scenario results data 372. Scenario results data 372 may include results 374 of scenarios that are run. These 374 may include at least the measures related to Performance Assessment Functions, described further herein, e.g. the minimum distances measured between each autonomous vehicle and other objects, and the speeds of these vehicles. Results may be stored in 374 both for verification test scenarios, and for calibration scenarios. 372 may also include full logs 373 of scenarios that are run, which may be utilized, for example, for replay. Examples of these functions are discussed further herein.

It should be noted that in the example implementation of FIG. 3*b*, all of 375, 370, 372 reside in memory 328. In other examples, there may be a different division of storage between memory 328 and storage 330. As one non-limiting example, data that is comparatively static, such as GIS DB 371, may in some examples be stored in storage 330. As another example, the large amount of data of full logs 373 may in some examples be stored in storage 330.

FIGS. 3*a* and 3*b* illustrate only a general schematic representation of the system architecture, describing, by way of non-limiting example, one aspect of the presently disclosed subject matter in an informative manner only, for clarity of explanation only. Only certain components are shown, as needed to exemplify the presently disclosed subject matter. Other components and sub-components, not shown, may exist. For example, in some cases scenario generator 352 may be only used for generating scenarios, and another module (not shown) may be used to calculate the required number of scenarios to run. Systems such as those described with respect to the non-limiting examples of FIGS. 3A and 3B, may be capable of performing all, some, or parts of the methods disclosed herein.

Each system component in FIGS. 3A and 3B can be made up of any combination of software, hardware and/or firmware, executed on a suitable device or devices, that perform the functions as defined and explained herein. Equivalent and/or modified functionality, as described with respect to each system component, can be consolidated or divided in another manner. Thus, in some examples of the presently disclosed subject matter, the system may include fewer, more, modified and/or different components, modules and functions than those shown in FIGS. 3A and 3B. One or more of these components can be centralized in one location, or dispersed and distributed over more than one location.

Each component in FIGS. 3 A and 3B may represent a plurality of the particular component, possibly in a distributed architecture, which are adapted to independently and/or cooperatively operate to process various data and electrical inputs, and for enabling operations related to algorithm verification. In some cases, multiple instances of a component may be utilized for reasons of performance, redundancy and/or availability. Similarly, in some cases, multiple instances of a component may be utilized for reasons of functionality or application. For example, different portions of the particular functionality may be placed in different instances of the component.

The communication between the various components of verification system 210, in cases where it is not located entirely in one location or in one physical component, can be realized by any signaling system or communication components, modules, protocols, software languages and drive signals, and can be wired and/or wireless, as appropriate.

It will be understood that that the teachings of the presently disclosed subject matter are not bound by what is described with reference to FIGS. 3A and 3B.

Figure 4:
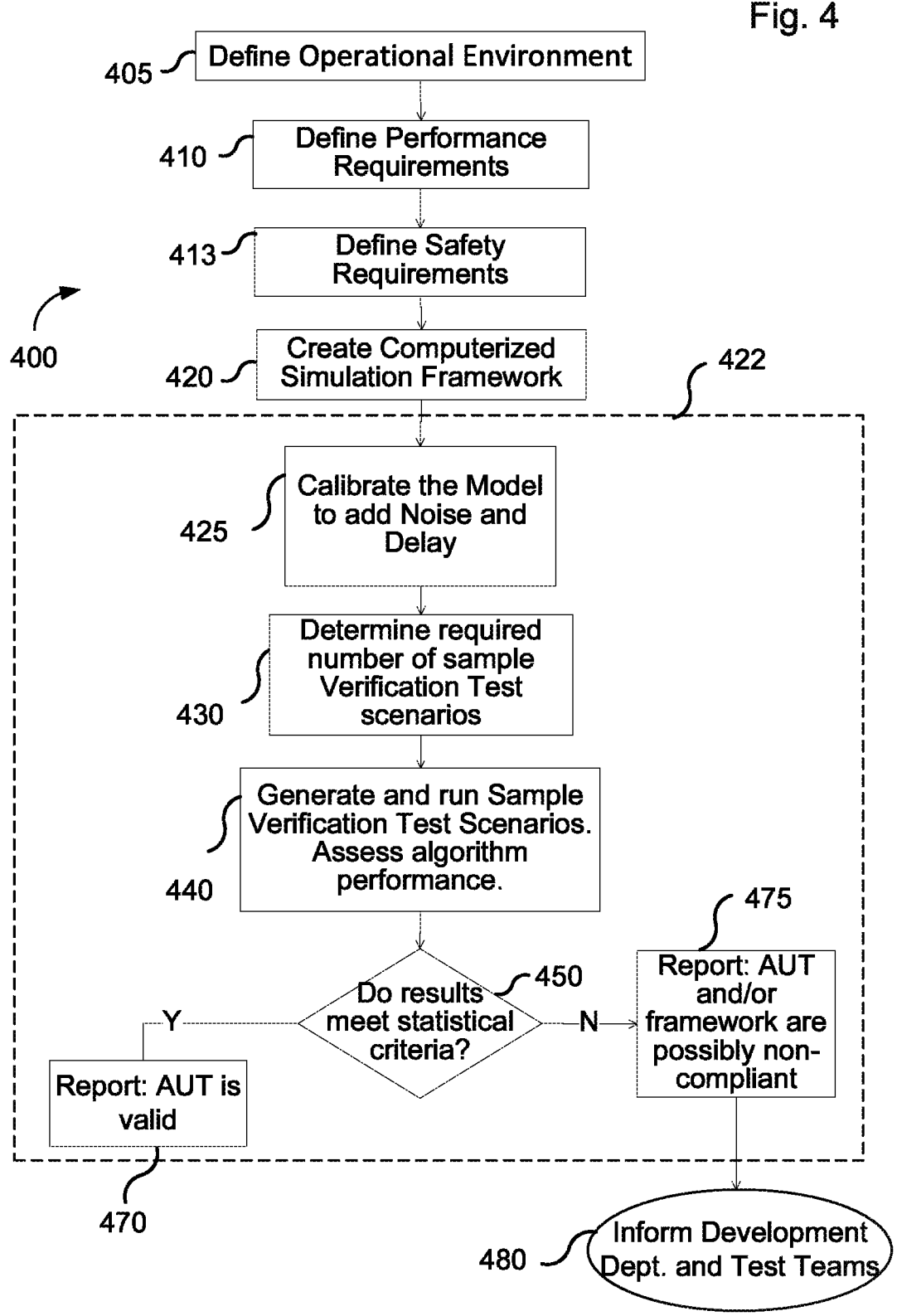
FIG. 4 illustrates an example of a generalized flowchart for verification of safety and functional performance in systems for control of autonomous vehicles, in accordance with certain embodiments of the presently disclosed subject matter.

A number of exemplary flows are disclosed herein. FIG. 4 discloses an example method, while FIGS. 5 and 7 disclose example methods that may in some cases implement steps within FIG. 4. FIG. 8 discloses example methods that may be optionally added to some of the methods disclosed with reference to FIG. 4.

Turning now to FIG. 4, it illustrates one example of a generalized flow chart diagram of a methodology 400 for verification of safety and functional performance in systems for control of autonomous vehicles, in accordance with certain embodiments of the presently disclosed subject matter. A methodology that may make use of a system such as 210 for functional and safety performance verification of algorithms for control of autonomous vehicles, may, in some example implementation, include at least some or all of the steps described with regard to FIG. 4. Some possible aspects of such a methodology 400, and considerations in implementing it, are described in the two articles, Verification of Safety for Autonomous Unmanned Ground Vehicles", Daniel Meltz and Hugo Guterman, 2014 IEEE 28th Convention of Electrical and Electronics Engineers in Israel, and "RobIL—Israeli Program for Research and Development of Autonomous UGV: Performance Evaluation Methodology", Daniel Meltz and Hugo Guterman, 2016 ISCEE International Conference on the Science of Electrical Engineering. Both of these documents are incorporated hereby by reference in their entirety.

A first step 405 may be the formulation or definition of the Scenarios Domain (SD) that describes the variety of all possible situations and scenarios that the autonomous vehicle system might encounter. The scope of SD definition includes environmental setups, including, for example, possible object scattering on the path of the autonomous vehicle(s). The scope may also include possible performance declines in the autonomous vehicle platform 110 and its sensors 171, and in fixed sensors 180. The scope may include also variations in the autonomous vehicle mission/objective guidelines. Factors such as those disclosed with reference to FIG. 1*a* may be examples of items to be included in SD definition. Another factor in a scenario is the number N of autonomous vehicles 257, 259 that must move and be controlled simultaneously. The scenarios domain may be referred to interchangeably herein as the operational environment.

The operational environment may be formulated as a list of scenario characteristics, with specified distributions, hierarchical dependencies, and rules of physical feasibility (e.g. a scenario cannot begin with a vehicle located in a tree). The operational environment definitions may be used as an input to a Procedural Scenario Generation (PSG) algorithm that will be used to generate random scenario samples later in the methodology. An example of a scenario feature might be the number of obstacles on the vehicle path; it is an environmental feature, and can be defined to vary uniformly discrete between 1 and 5, for example. Another scenario feature might be the location of the waypoints of the path that is required to be traveled by the autonomous vehicle; this may be a feature that is related to the mission guidelines. And, as the obstacles must appear on the path of the UGV, a hierarchical relationship is needed to ensure that the positions of the obstacles are derived relative to the path of waypoints. Another hierarchical definition that may require definition is between the waypoints of a path; this is to prevent generation of paths with absurd cutoffs and turning angles. Supplementing the hierarchical relations, validity laws can be required to guarantee bottom line correctness of scenarios; for instance, a validity law might be useful to ensure that none of the path waypoints are situated outside the provided terrain.

The operational environment formulated in step 405 may in some cases be stored in the memory 328 of processing circuitry 320, as operational environment 370. This could be done, for example, by input of the defined PA requirements by a user, using input devices 335, into the User Inputs Module 362 of verification module 340, running on the processor 325, and storage by user inputs module 362 of the requirements into operational environment 370. Part of this operational environment 370 may in some cases include a GIS DB 371 defining for example the road network 105 and traffic signals 152, 154. In some cases, this may have been imported from the GIS DB for a real road network of a real city or region.

The next steps in the methodology may be steps 410 and 413, the formulation of Performance Assessment Functions (PAFs). PAFs and their Score Criteria (required numeric values of the functions) may be used to define the acceptable behavior limits of the autonomous vehicles. In some examples, two types of PAF may be defined; one type for Functional Performance, and another for Safety Performance. The score criteria may be indicative either of algorithm performance requirements, or of algorithm safety requirements, or of both.

Functional Performance Assessment Functions (F-PAFs), defined in step 410, may be used to represent the main functional requirements of the AUT that are not necessarily safety-related. An example of F-PAF may be the average speed at which the autonomous vehicle travels a path in a scenario. A non-limiting sample score criterion, in this case, might be defined as 70% of the maximum possible speed (assuming that the operator requires maximum speed). Other criteria may look at average, median and/or maximum times to complete objectives, as a function of the distance to be covered; or, for example, maximum accelerations performed. F-PAFs may be utilized in order to deal with situations where an AUT that does not move the vehicle at all, or performs extreme deviations from the required path, achieves perfect safety scores. In these cases, the F-PAF scores mayexpose the problem with an algorithm that achieves safety at the expense of poor functional performance, and thus may be useless. An AUT that passes the verification process performed by, for example, verification system 210, may be one that meets the safety criteria without sacrificing functional performance.

The Safety Performance Assessment Functions (S-PAFs), defined in step 413, may represent the safety requirements that must be met by systems controlled by the AUT. For example, a safety requirement might be: "In any case, each autonomous vehicle should not come closer than 0.1 m to any object during an autonomous navigation". In this case, the S-PAF may be defined as the parameter "minimal distance of each autonomous vehicle to any object during a scenario"; the Score Criterion may be defined to be 0.1 m. Another S-PAF may be the prevention of automotive instability (prevention of the autonomous vehicle overturning or sliding uncontrollably). The above are non-limiting examples of S-PAFs. The F-PAFs and S-PAFs may be referred to herein interchangeably as sets of criteria indicative of algorithm performance requirements and of algorithm safety requirements, and as algorithm verification test criteria.

The above are examples of F-PAFs and S-PAFs that are relevant for each scenario. That is, in a particular scenario, it may be desirable that the score criteria for these PAFs should be met for each autonomous vehicle. In addition, since the verification testing of the AUT will performed on a large number of different scenarios, it may, in some cases, be advantageous to define verification of an AUT in terms of statistical behavior—that an AUT may be said to "pass" (e.g. be declared high-performing and/or safe) in a case where the PAFs are met on a statistical basis over the large number of algorithm verification test scenarios run in the simulation verification testing. Thus, a set of statistical verification criteria may be defined, that are indicative of the set or sets of criteria indicative of algorithm performance requirements and of algorithm safety requirements. Such a definition may be in some cases be done as part of steps 410 and 413; in other cases, as an additional step, or steps, in the methodology (not shown). A non-limiting example set of statistical verification criteria that are indicative of the set or sets of criteria indicative of algorithm performance requirements and of algorithm safety requirement may be as follows: if testing shows that the chance for the minimal distance to an object to be less than the score criterion, in any scenario within the operational environment, is less than one in a million with a confidence level that is higher than 95%, then it may be declared that the ALUT is proven to meet safety requirements.

Note that calibration may be performed in the presently disclosed subject matter with the purpose of adding severity to the simulation framework, rather than to verify AUT performance, as will be described further herein. Therefore, in some example cases, a set or sets of criteria, indicative of algorithm performance requirements and of algorithm safety requirements, may be defined for calibration scenarios, that is separate from the sets used for algorithm verification testing. They may be referred to herein as sets of calibration criteria indicative of at least one of algorithm performance requirements and algorithm safety requirements.

Similarly, a set or sets of statistical criteria indicative of the set of algorithm performance and algorithm safety criteria, may be defined for calibration scenarios, that is separate from the sets used for algorithm verification testing. They may be referred to herein as sets of statistical calibration criteria indicative sets of calibration criteria.

In some cases, these criteria for calibration may be less strict than those for the verification testing. As one non-limiting example, a set of statistical calibration criteria may require a confidence level that is higher than 80%, as opposed to 95% for statistical verification criteria.

The requirements determined in steps 410 and 413 may in some cases be stored in the memory 328 of processing circuitry 320, as Requirements 375. This could be done, for example, by input of the defined PA requirements by a user, using input devices 335, into the User Inputs Module 362 of verification module 340, running on the processor 325, and storage by user inputs module 362 of the requirements into requirements data 375.

The next step in the methodology may be 420, the creation of a computerized simulation framework.

The modeling of the simulated vehicle platform and sensors, and of their interaction with the environment, may be based on real-world experiments. In these experiments, the sensitivity, accuracy, signal delay, and noise distribution of sensors such as 171 and 166 may be studied, as well as the autonomous vehicle platform's response characteristics to various throttle/acceleration, brake, and commands issued to the vehicle actuators 179 (e.g. response delay time, rise time, overshoot, and settling time). The modeling may also be based on the manufacturer's stated performance parameters (tolerances, noises, delays etc.) for various components. Vehicle modeling 257, 259 may, for example, include modeling of the vehicle dynamics, as well as of the various actuators and sensors. Note that different models may be created for different types of autonomous vehicles. That is, for example, buses, taxis of manufacturer A and taxis of manufacturer B may each have different dynamic characteristics (e.g. maximum speed, acceleration and braking capabilities, turning radius, weights and inertias) and may make use of different sensors (e.g. type, specific model of product, quantity, position on vehicle etc.). In case several different Algorithms Under Test are tested with the aid of the verification system 210, the mapping of AUTs to modelled vehicles may also be done during the modelling step.

The modelling step may also include modelling of communication interfaces such as 168, 170, including their sensitivity, accuracy, signal delay, and noise distribution.

In some examples, the framework created in such a simulation step may be computer software and data structures such as simulation framework 270, described with regard to FIG. 2. It should be noted that careful modelling is required to achieve a framework that closely models real-world behavior. The output of such a step 420 may be one or more sets of parameters of the computerized simulation framework 270 that are indicative of navigation scenarios. This may include, in some example cases, various parameters discussed with regard to FIG. 1*a*, e.g. number and types of vehicles, number and type of obstacles and their locations, traffic signals etc.

The development of the simulation framework in step 420 may in some cases also include the implementation of an algorithm for Procedural Scenarios Generation (PSG), that would allow pseudo-random sampling and creation of scenarios from the operational environment in the computerized simulation framework 270. In some cases, an adjustment of the probability curves of various parameters may be performed, to emphasize the parameter values that are more common in real life. The Monte Carlo simulation might thus be based on curves of input parameters that are not, for example, Gaussian. These may yield scenarios that will test the AIT(s) in a more efficient way than might be obtained from a purely evenly scattered pseudo-random generation of scenarios, since a pseudo-random generation might give equal weight to every possible scenario and might therefore require the AUT to function well also in situations that are not realistic. In some cases, the PSG may be tailored to the specific operational environment as well as to the simulation framework. Note also that, in some cases, the PSG algorithm may be implemented as a step separate from step 420.

As one non-limiting example, a car may be capable of travelling between 0-150 km/hr, but it will rarely drive most of a route at say less than 20 km/hr, in conditions where there is not heavy traffic. Similarly, based on time of day and day of week (e.g. rush hour), traffic patterns may change the typical speeds of vehicles. Similarly, in scenarios simulating bad weather and/or night hours, speeds will be distributed around a lower average speed than in daytime good-weather scenarios. As another example, in certain countries or regions, pedestrians tend to behave in a more or less unpredictable fashion, and thus the probability of a pedestrian bursting onto a street may be biased in a certain direction. Similarly, by using GIS DBs 371, describing the road and street networks of real cities and regions, the operational environment will use road networks that are more representative of real driving situations, rather than possibly less realistic road densities, turning ratios, topography etc. that a purely pseudo-random generation of road networks, giving equal weight to every theoretically possible road network, might yield.

Even after a significant effort of modeling, in some cases some modeling inaccuracies will remain, due the difficulties of reducing real-life behavior to a computerized model. Therefore, the next step in such a methodology may be 425, the computerized calibration of the simulation framework, that is a process where noise and delay are added in a controlled fashion to the framework 270. One way to deal with modeling inaccuracies may be by introducing a mechanism that allows control of the severity of the interfaces 245 between the AUT 220 and the simulation verification testing environment (computerized simulation framework 270). By control of severity it may be meant that the delay and noise, for example, on the AUT input channels from the various sensors, and on the AUT output channels to the various vehicle actuators of the various vehicles, may be adjusted. This adjustment may, for example, be achieved by means of adjustment commands 216 sent from the verification system 210 to disruptors 248. The disruptor for each relevant modelled component within 270 may include parameters indicative of noise and/or delay in the component. These may include parameters indicative of noise and/or delay in fixed or vehicle sensor(s), in response to autonomous vehicle(s), to command(s) from the AUT, and in communications among management system(s), autonomous vehicle(s) and fixed sensor(s). Such a calibration process may also be referred to herein as an AUT sensitivity study.

One rationale for such a calibration action may be, that in most cases an AUT that is not intentionally or fundamentally faulty will, on average, perform better with sensor input readings that are less noisy and less delayed, and with a vehicle platform that has smaller response delay and greater stability. Therefore, if the noise and delay disruptors 248 are adjusted to add sufficient additional noise and delay to AUT interfaces (inputs and outputs), thus causing the noise and delay conditions in the simulator to be more severe than in reality, the inaccuracies associated with modeling sensors and vehicles may be absorbed within the more severe AUT input and output conditions. As a result, successful verification of the AUT, performed in a separate step such as 440, may be robust to modeling inaccuracies.

Examples of inaccuracies that the calibration process may be able to absorb may be the inability to fully recreate, in the simulation, real platform dynamics. Other example inaccuracies that may be addressed in the calibration step are variations which might occur in system configurations, such as in platform mass and inertia as a result of additional payload, or variation in sensor positions as result of incorrect installation, or of an accident. Similarly, the modeling may also incorporate consideration of possible faults and malfunctions in sensors, in communication and in the vehicle platform. Malfunctions might cause performance declines, e.g. increase in noise, delay, disconnections, and combinations of all these factors.

One non-limiting example of a need for such robustness may be that, due to delay in the acceleration mechanism, a particular autonomous vehicle 120 is in an intersection later than it should be, while a second vehicle 110 may be then arriving at the intersection. Increasing the severity of such a delay in the framework may force the AUT to be sufficiently robust to deal with such conditions.

In some examples, the process of step 425 may be performed by the verification system 210. System 210 may perform this is in an automated fashion, using Noise and Delay Calibration Module 355 within Verification Module 340, which, in some cases, may be running on processor 325. Example methods for performing such calibration are discussed further herein with regard to FIGS. 5 and 6.

The next step in the methodology 400 may be 430, to determine a statistically significant number of algorithm verification test scenarios to be generated in the simulated framework, and to run on the simulated framework. This may be done, for example, using known statistical methods. In some example cases, this number of algorithm verification test scenarios may be 100. In some cases, it may be 200. In some cases, it may be 1000. In some cases, it may be 10,000. In some cases, it may be 100,000. Algorithm verification test scenarios may also be referred to herein simply as verification test scenarios. The set of algorithm verification test scenarios may also be referred to herein as an algorithm verification scenarios set.

In some cases, verification system 210 may perform this, for example using scenario generator 352 of verification module 340, possibly running on processor 325. Alternately, there may be, in some cases, a separate module (not shown) dedicated to calculating the statistically significant number of algorithm verification test scenarios to generate and run.

The next step in the methodology 400 may be 440, to generate and run the statistically significant number of algorithm verification test scenarios in the simulated framework. In some cases, verification system 210 may perform this, for example using scenario generator 352 of verification module 340, possibly running on processor 325. In some examples, this may make use of an algorithm for Procedural Scenarios Generation (PSG), possibly created as part of the step 420 of creating the simulation framework. Generation of scenarios may, in some examples, make use of the operational environment stored in 370, within memory 328 of processing circuitry 320. These scenarios may be sets of parameters and values to be used in the simulation framework 270 and in the mission objectives 212. The results of the verification test scenarios run may be stored, for example, in 374 in memory. As will be discussed further herein, these results may be referred to herein as second results. The second results may include performance scores assigned to the AUT for the scenario that was run. Each scenario will generate its second result (possibly comprising multiple pieces of data), and thus all of the scenarios run in step 440 may yield a set of second results. The results of the scenarios may be assessed, using statistical methods, to determine the performance of the AUT as regards function and/or safety. This assessment and determination may be performed by Performance Evaluator/Grader 360. Example methods for running such test simulations are discussed further herein with regard to FIG. 7.

The next step in the methodology may be 450. Performance Evaluator/Grader 360, for example, may compare the performance results determined in step 440 to the safety and/or performance requirements 375, to see if the requirements were met by the verification test runs of the simulations in aggregate. These requirements 375 may be a set, or sets, of statistical criteria indicative of the sets of algorithm verification test criteria. These statistical criteria may have been defined, for example, as part of steps 410 and 413. One non-limiting example of such statistical criteria may be that the chance that the minimal distance from an autonomous vehicle to an object is less than the score criterion, in any scenario within the operational environment, is less than one in a million with a confidence level that is higher than 95%. Step 450 may determine whether the set of second results meets the set or sets of statistical criteria.

In response to the determination at step 450 being Yes, that the requirements were met, that the set of second results meet the set or sets of statistical criteria, in step 470 the verification system 210 may generate and output a report of compliance of the algorithm to the set(s) of statistical criteria, that the AUT is valid, that it performs in a sufficiently robust way in simulation to be considered safe and/or of acceptable function. Such a report may be output, for example, by performance Evaluator/Grader 360 to a user via user outputs module 364 of verification module 340, to output devices 338 of verification system 210.

In response to the determination at step 450 being No, that the requirements were not met, that the set of second results do not meet the set or sets of statistical criteria, in step 475 the verification system 210 may generate and output a report indicating possible non-compliance of the algorithm (or at least one of the algorithms, in a case of multiple AUTs) to the set(s) of statistical criteria, that the AUT is not satisfactory, that it does not perform in a sufficiently robust way in simulation to be considered safe and/or of acceptable function. Such a report may be output, for example, by performance Evaluator/Grader 360 to a user via user outputs module 364 of verification module 340, to output devices 338 of verification system 210.

Note that, in a case where multiple AUTs are being verification-tested, it is possible that testing may fail even though only some of the AUTs are problematic. In some cases, the report may include, for example, which AUTs were associated with vehicles that crashed. As one non-limiting example, a report may say that vehicles using AUT #1 were involved in 95% of the crashes, while vehicles using AUTs #2 and #2 were involved in only 5% of the crashes, and that the crashes of the latter were always with AUT #1 vehicles.

Similarly, even in a case where only one AUT is being tested, it is possible in some cases that algorithm verification testing fails under certain operational environment conditions. In some cases, the report may break down the failures based on environmental conditions. For example, it may show that in 90% of the failures, the scenario was of night driving, or heavy rain, or involved stopping at red lights or sharp left turns etc.

The report may in some cases indicate that the calibration process may be a possible cause of the failure to meet requirements in step 450. In such a case, there may be a need to decrease the noise and delay parameters in the framework, as they are still too severe to allow effective verification of the AUT using the verification tests. In such a sense, the verification tests 440 may serve also as a check on the calibration 425.

Such a report may be sent 480 to the AUT Development Department, which may use this information to identify possible failure points in the AUT, and as input to activities to modify the AUT. It may also be sent to the testing teams, to check the calibration settings. The AUT and/or the calibration may be possible causes of the algorithm verification test failure. The development department and testing teams may possibly also make use of additional data stored in results data 372.

In some example cases, broken line 422 may indicate steps in the methodology that may be performed as a computerized method, for example by verification system 210.

In some examples, the noise and delay calibration step 425 may be accomplished by iteratively performing an adjustment. The adjustment may include one or more of the following steps:

a) updating or adjusting the value of at least one parameter, indicative of noise and/or delay in one or more simulated sensors, associated with a computerized simulation framework 270, by increasing at least one of noise and delay in that sensor parameter. The simulated framework may correspond to at least one simulated vehicle 257, 259, and to an operational environment. The sensor or sensors may be a fixed sensor 255, 256, and/or a sensor or sensors located on, or associated with, one or more autonomous vehicles 257, 259.

b) updating or adjusting the value of at least one parameter, indicative of at least one of noise and delay in a response of the one or more simulated autonomous vehicles to one or more commands, by increasing the noise and/or delay.

Some or all of these steps may be performed, until an increased—severity computerized simulation framework is obtained from the computerized simulation framework. The resulting increased-severity computerized simulation framework(s) may meet a criterion that can be utilized for statistical verification of safety performance, and/or statistical verification of functional performance, of the algorithm(s) under test 220.

As described with regard to step 425, such an increased-severity computerized simulation framework may be utilized to perform statistical simulation algorithm verification testing of the AUT in a robust fashion, while accounting for inaccuracies in the framework 270. It may account for inaccuracies, due to the fact that the simulation framework does not function in an optimal manner, which was caused by noise and delay added during the calibration process.

Such an increased-severity computerized simulation framework may represent a working point that, on the one hand, would be severe enough to absorb the potential inaccuracies in the simulated models, while, on the other hand, would not harm the performance of the AUT in simulation algorithm verification testing to a degree that the AUT would fail to demonstrate the required performance only because of this harshening of conditions.

The increased-severity computerized simulation framework may thus be referred to herein also as a non-optimal computerized simulation framework.

Figure 5:
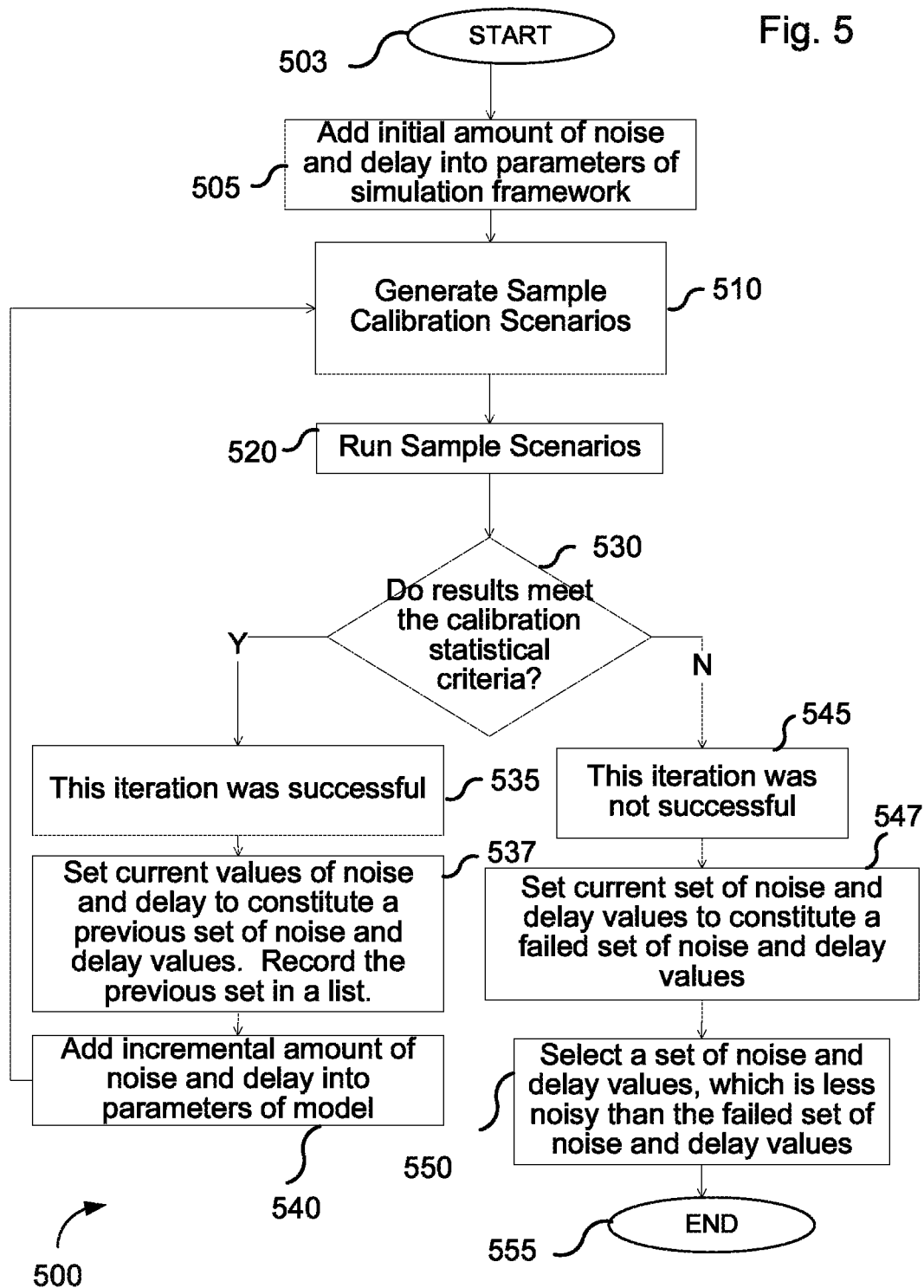
FIG. 5 illustrates an example of a generalized flowchart for verification of calibration of noise and delay, in accordance with certain embodiments of the presently disclosed subject matter.

Turning now to FIG. 5, it illustrates one example of a generalized flow chart diagram of a methodology 500 for verification of calibration of noise and delay, in accordance with certain embodiments of the presently disclosed subject matter. In some example cases, a flow similar to 500 may be used to implement step 425 of flow 400, using iterative performance of an adjustment as described above.

In step 505, an initial amount of noise and delay is added to parameters of the simulation framework, e.g. the framework 270. The adjustment may be, in some examples, performed by noise and calibration delay module 355 of verification module 340, running on processor 325. In some examples, this may be accomplished by the noise and calibration delay module 355 sending commands 216 for noise and delay adjustment to various individual controls/disruptors within 248. The adjustment may include one or more of the following:

i) updating or adjusting the value of one or more parameters indicative of noise or delay, or both, in one or more fixed sensors 255, 256, and/or in sensors in the one or more autonomous vehicles 257, 259. The noise and/or delay will be increased.

ii) updating or adjusting the value of one or more parameters indicative of noise or delay, or both, in the response in the one or more autonomous vehicles 257, 259. The noise and/or delay will be increased.

iii) updating or adjusting the value of one or more parameters indicative of noise or delay, or both, in communications among the one or more autonomous vehicles 257, 259, the management system 188 and/or the one or more fixed sensors 255, 256. The noise and/or delay will be increased.

In some cases, the initial adjustment may be to add the manufacturer's stated tolerances, in terms of noise and delay. This initial adjustment may also use noise and delay information obtained from live experiments.

After these updatings or adjustments, the values of the sensor noise and delay parameters, and the vehicle-response noise and delay parameters, will constitute the current set of noise and delay values. This current set will be used to run a set of calibration scenarios in step 520.

In step 510, a the number of sample scenarios that are appropriate for the calibration task may be determined. The appropriate number may be a statistically significant number, determined for example using known statistical methods. The statistically significant number of calibration scenarios may in some cases be significantly smaller than the statistically significant number of algorithm verification test scenarios determined, for example, in step 430. In some example cases, this number of calibration scenarios may be 10. In some cases, it may be 100. In some cases, it may be 500. In some cases, it may be 1000. In some cases, it may be 2000.

The set of sample calibration scenarios may be generated, based on the total operational environment (which may be stored as 370). These scenarios may be based on sets of parameters, and on parameter values, to be used in the simulation framework 270 and in the mission objectives 212. These may be parameters indicative of navigation scenarios, e.g. those described with respect to FIG. 1a, as a non-limiting example. In some example cases, the calibration scenarios may be generated in a pseudo-random manner. This step 510 may be performed, in some cases, by scenario generator module 352 of verification module 340, possibly running on processor 325. Alternately, there may be in some cases a separate module (not shown) dedicated to calculating the appropriate number of test scenarios to generate and run.

In step 520, the sample calibration scenarios generated in step 510 may be run on the computerized simulation framework. Note that the runs will be based on the current set of noise and delay values. For each scenario, verification system 210 may send mission objectives 212 to AUT 220, and results may be sent from the framework 270 to 374 within results data 372, in memory. The runs of the scenarios will generate results. These results may be also referred to herein as first results. These first results of the scenarios may be assessed, using statistical methods, to determine the performance of the AUT as regards function and/or safety. The first results may be assessed against the set(s) of calibration criteria indicative algorithm performance requirements and/or algorithm safety requirements. This assessment and determination may be performed by Performance Evaluator/Grader 360.

The next step may be 530. The verification system 210, for example using Performance Evaluator/Grader 360, may determine whether a criterion is met that can enable the current setting to be utilized for statistical safety verification and/or statistical functional performance verification. For example, system 210 may compare the performance results determined in step 520 to the safety and/or performance requirements 375, to see if the requirements were met by the test runs of the simulations in aggregate, that is to determine whether the first results meet the set or sets of statistical calibration criteria, which were defined for example in steps 410, 413. In response to the determination at step 530 being Yes, that the requirements were met, the first results meet the set or sets of statistical calibration criteria, and thus that the iteration was successful 535, the process may proceed to step 537. In step 537 the verification system 210 may first set the current values of the sensor noise and delay parameters, of the vehicle-response noise and delay parameters, and of the communications noise and delay parameters (that is, the current set of noise and delay values) to constitute a previous set of noise and delay values. The process may also record this previous set of noise and delay values in a list of previous sets of noise and delay values. Such a list may be stored in memory 328.

In step 540, the verification system 210 may add an incremental additional amount of noise and delay into parameters of the simulation framework, e.g. the framework 270, further updating the parameters. This may be performed, in some examples, by noise and calibration delay module 355. In some examples, this may be accomplished by the noise and calibration delay module 355 sending commands 216 for noise and delay updating to various individual controls/disruptors within 248. After these updates or adjustment(s), the values of the sensor noise and delay parameters, and of the vehicle-response noise and delay parameters, will now constitute the current set of noise and delay values.

The process may then loop back to step 510, where again a set of calibration scenarios is determined and generated. This may have the advantage of not making the calibration dependent on the first scenario generated. In other examples, the same scenario may be used for all loops of the calibration process—in which case the process would loop back to step 520. Note also, that in some cases, data acquired during this iteration of the process may serve as an input in the next run of step 520, in the determination of how many sample scenarios should be generated for calibration.

In response to the determination at step 530 being No, that the requirements were not met, that the first results do not meet the set or sets of statistical calibration criteria, that the iteration was not successful 545, the process may continue to step 547. In step 547 the verification system 210 may set the then-current set of noise and delay values to constitute a failed set of noise and delay values.

In step 550, system 210 (e.g. using noise and calibration delay module 355) may select a set of noise and delay values, which is less noisy than the failed set of noise and delay values, and may set the selected set to constitute the current set of noise and delay values. The system may set the simulation framework 270 to use this new current set of noise and delay settings for the disruptors 248. Thus the increased-severity computerized simulation framework(s) that are derived by this process may be based on the original computerized simulation framework(s) and also on the current set of noise and delay values.

In some examples, the selected set of noise and delay values may be one of the previous sets of noise and delay values, selected from the list of previous sets. That is, the selected set may be one of the settings of noise and delay that were used to run an iteration of the running 520 of sample scenarios. In one example, the set of values selected in step 550 may be the then-current previous set of noise and delay values. This then-current previous set may be the set of values corresponding to the iteration immediately previous to the iteration that failed 545 the determination 530, that is the last value corresponding to the last iteration that successfully passed 535 the determination 530. In still other example cases, the set of values selected in step 550 may be the average of two of the levels of noise and delay that were used to run iterations of the running 520 of sample scenarios.

In some cases, the set of values selected in step 550 may be output as a recommendation to a user, using for example the user outputs module 364 and output devices 338, for confirmation by the user, and possibly modification by the user of calibration settings via input devices 335 and user inputs module 362.

In step 555, the simulation framework 270 may have been updated with the chosen levels of noise and delay, and thus the noise and delay calibration process may be completed.

Turning now to FIG. 6, it illustrates one example of a generalized methodology 600 for adjusting levels of noise and delay, in accordance with certain embodiments of the presently disclosed subject matter. In some example cases, a method similar to 600 may be used to implement steps 505 and/or 540 of flow 500. Note that this method 600 is one non-limiting example.

Column 605 lists a very simplified set of example parameters of noise and delay, that may be associated with disruptors such as 240, 241, 242, 244. It should be noted that this example is simplified, for ease of exposition. In real implementations, the number of parameters may be much larger. Parameters 665, 670, for example, may be associated with noise in vehicle sensors 171, while parameter 695 may be associated with noise in fixed sensors 166. Parameter 680 may be an example of delay in a vehicle sensor. Parameter 680 may be an example of a delay in response of an autonomous vehicle, to a command from the AUT. Parameter 690 may be associated with delay in communications 170 of autonomous vehicles 257, 259, and may thus be indicative of a delay in communications among autonomous vehicles, fixed sensors and the management system.

Column 610 lists example values of noise or delay in each parameter. These values may be defined, in some cases, during the creation of the simulation framework in step 420, and may be based, for example, on manufacturers' specs and/or real-life experiments that characterize each parameter's typical values. These may be used as the parameters for the initial adjustment step 505. For simplicity of exposition, all of the initial delays are shown as 1 millisecond, and all of the initial noises as a 0.5% variation in accuracy of the measured parameter. Note that these numeric values are only examples for purposes of exposition. In the example, the scenarios are generated 510, and then run 520, and step 530 determines whether the requirements (statistical calibration criteria) were met. It may be determined in step 535 that the iteration was successful, and thus that more noise and delays should be added.

One simple method of adjusting noise and delay may be to alternate adjustments of noise and of delay. In the example, all delays are increased, and by the same value 2 ms. Then all noises are increased, and by the same value 0.5%, and so on. Thus column 620 shows a 2 ms increase in delays, from 1 ms to 3 ms, done for example as step 540. Steps 510, 520, 530 are performed again, the criteria are still met, and thus a $2^{nd}$ iteration of increase is done, shown in column 630—an increase in all noises by another 0.5%, to 1%. The process is repeated, a $3^{rd}$ iteration of increase is done, shown in column 640—another 2 ins is added to each delay parameter, and so on.

In the $4^{th}$ iteration, see 650, another 0.5% is added to the noise of each noise parameter, and the noise is now 1.5%. But this time, steps 510, 520, 530 are again performed, but in step 530 the results fail the statistical calibration criteria related to safety and or functional performance. The level of noise and delay indicated in column 650 was too high, and this may have caused the simulations that were run to fail the statistical calibration criteria. Column 650 may constitute a failed set of noise and delay values. This too-high level of noise and delay may be expected to provide a level of test failures that is not indicative of problems with the AUT, but rather may be indicative of an addition of too much noise and delay to the disruptors 248. Such a level thus may not be expected to yield worthwhile verification of the AUT in steps 440 and 450. The framework has been made too severe.

In step 660, a set of noise and delay values is selected that has lower noise than the failed set. This may correspond to step 550. In the example shown, one of the previous sets of noise and delay values, was selected from the list of previous sets. In the non-limiting example of table 600, the then-current "previous set" of noise and delay values, that is 640, is selected to be the final calibration level to be used in simulation verification testing step 440. 640 represents that level of noise and delay that last resulted in scenarios that were run 520 and passed the criteria in 530. In another non-limiting example, an average of the levels of 630 and 640 might be selected to be the final calibration level—in such a case the selected levels would be 1% noise and 4 ms delay.

In some other non-limiting examples, all noise and delay parameters may be increased simultaneously, e.g. in equal increments.

In some other non-limiting examples, a test engineer or operator may make use of priori knowledge of the field of autonomous vehicles, to identify those parameters that are more sensitive to noise and delay, whereby small amounts of noise and delay in those parameters may have a relatively large impact on scenario behavior. The engineer may input these identified parameters as some prioritized or ordered list, for example, whereby the system will first increase noise and delay in the more relevant parameters, and only afterwards increase noise and delay in the less relevant parameters. This input could be done, for example, using input devices 335 and user inputs module 362 interacting with noise and delay calibration module 355. As one non-limiting example, assume that autonomous vehicle maneuvering is known by the engineers to be very sensitive to GPS delay 680. These might be increased by the system per the method 500, until reaching a certain user-defined maximum noise and delay level. Only if the simulation still performs well (passes step 530), after reaching the user-defined maximum noise and delay level, will the system then increase the next-highest-priority noise and delay parameter on the input list. For example, if a large increase of 680 did not cause failure at 530, the second most important parameter on the prioritized list may be vehicle speed accuracy measured in GPS, 670, and that parameter may then be iteratively increased. If, on the other hand, the determination 530 failed 545 after only a small number of iterations of GPS delay 680 increase, the calibration may, in such an example, have been completed 555, and sufficient noise may have been added to provide a robust test simulation, without the need to increase other noise and delay parameters.

Thus, it can be seen that FIG. 6 describes only one possible non-limiting example method.

Figure 7:
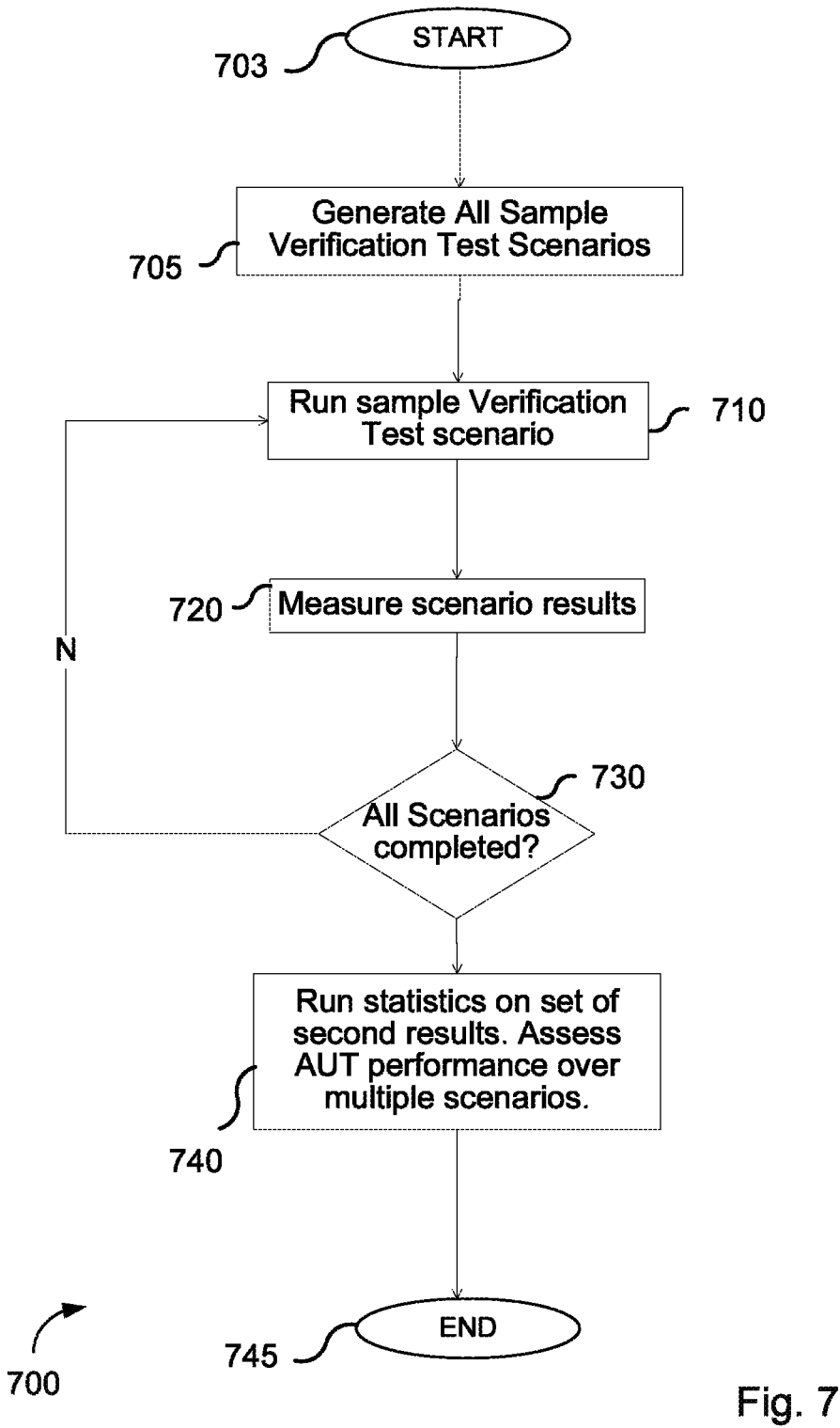
FIG. 7 illustrates an example of a generalized flowchart for generating and running of test scenarios of simulation to verify algorithms, in accordance with certain embodiments of the presently disclosed subject matter.
Figure 8:
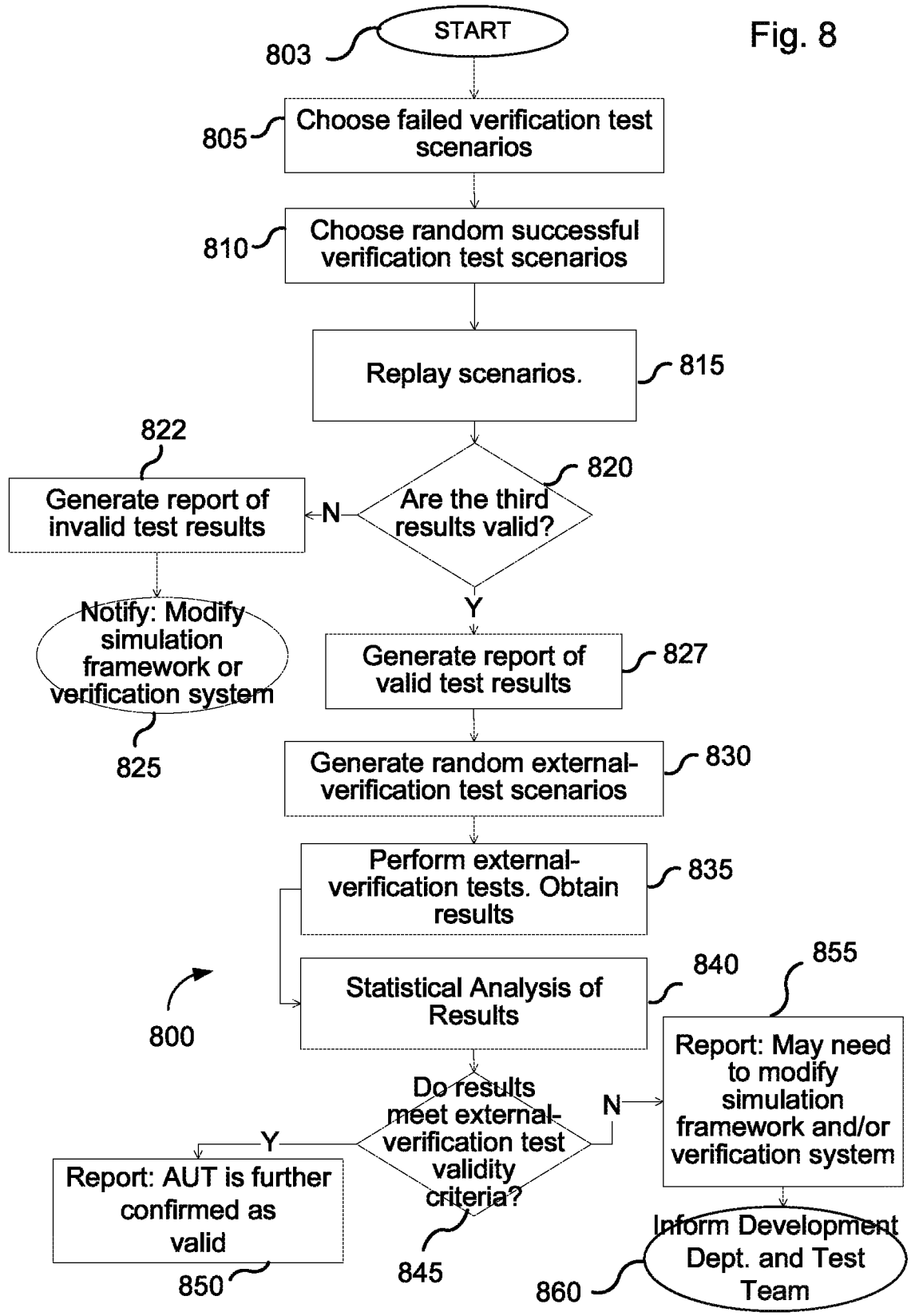
FIG. 8 illustrates an example of a generalized flowchart for additional testing of algorithms, in accordance with certain embodiments of the presently disclosed subject matter.

Turning now to FIG. 7, it illustrates one example of a generalized flow chart diagram of a methodology 700 for generating and running algorithm verification test scenarios of simulation to verify the AUT(s) 220, in accordance with certain embodiments of the presently disclosed subject matter. In some example cases, a flow similar to 700 may be used to implement steps 440 of flow 400.

The process starts at step 703. In step 705, the full set of verification test simulation scenarios to be run is generated, e.g. by scenario generator 352, which may be part of verification module 340 running on processor 325 in verification system 210. The verification test scenarios may be generated based on one or more sets of parameters of the computerized simulation framework 270 that are indicative of navigation scenarios. This may include, in some example cases, various parameters discussed with regard to FIG. 1a, e.g. number and types of autonomous vehicles, their mission objective, the road network 105, the number and types of sensors and their location, number and type of obstacles and their locations, traffic signals etc. The scenario may also include failures (e.g. the modelled fixed sensor 255 is "broken", and provides no sensing information). The generated set of algorithm verification test scenarios may also be referred to herein as the verification test scenario set.

In step 710, one generated algorithm verification test scenario of the algorithm verification scenarios set may be run. Verification system 210, e.g. using scenario generator 352, or possibly some other module, may send mission and objectives 212 to the AUT 220, as shown in FIG. 2 and FIG. 3. The set of results of each scenario run may in some cases be output 218 by simulation framework 270 to be stored, for example, in test results 374 in memory. These results may be also referred to herein as second results. In addition, in some cases the simulation framework 270 may also output 218, to memory 328, full log results 373 of the entire scenario. This may for example be a log of every movement of every object, of every sensor measurement, of every command received from AUT 220, etc. This may be used later to completely recreate and inspect a run scenario, as it develops over time. (See further herein regarding FIG. 8.)

In step 720, these results of the scenario may be measured, and graded against the S-PAFs and F-PAFs. They may be measured against a set or sets of criteria indicative of algorithm performance requirements and of algorithm safety requirements, that is against a set or sets of algorithm verification test criteria. It may be determined whether the performance of the scenario meets the various scoring criteria. Grades may be evaluated for each individual autonomous vehicle, and for the scenario as a whole. This may be done, in some examples, by performance evaluator/grader 360, which may be part of verification module 340 running on processor 325. The PAFs may have been stored as part of safety and/or performance requirements 375, and provided 382 by 375 to 360. The results of the determination (e.g. which criteria were met and which failed, what the grades of each PAF and each score criterion were) may be stored for later use. They may be stored, for example, in memory 328. They may be stored in results 374, or perhaps in a different data structure within the memory.

In step 730, the process may determine whether all of the sample algorithm verification test scenarios generated in step 705 were run, and their results measured. This may be done, in some examples, by scenario generator 352.

In response to the determination at step 730 being No, that not all of the sample algorithm verification test scenarios of the verification set were done, the process may loop back to step 710, for the next iteration of running scenarios and measuring results. Since a second result (possibly comprising multiple pieces of data) is generated for each algorithm verification test scenario run, this iterative process may generate a set of these second results.

In response to the determination at step 730 being Yes, that all of the sample algorithm verification test scenarios in the algorithm verification scenarios set were run, the process may continue to step 740. Statistics may be run on the set of second results created in the various iterations of step 720, to obtain an assessment of the performance of the AUT(s) over multiple scenarios. Such statistical calculations may in some cases use known statistical methods. The statistical results may be compared to one or more sets of statistical verification criteria indicative of the set of criteria indicative of algorithm performance requirements and of algorithm safety requirements. This may be done, in some examples, by performance evaluator/grader 360.

This process may end at step 745. It may be followed, for example, by step 450 of FIG. 4, in which the statistical results may be compared against the set or sets of statistical criteria for successful AUT, so as to determine whether the set of second results meet the set or sets of statistical criteria.

Note that methods 400 and 700 have been described above in terms of a use to verify a previously-developed algorithm. In some example cases, these methods, or parts of them, and the systems that run them, may also be usable in the algorithm development process itself, possibly in early stages of that process. For example, the AUT may in some cases make use of machine learning. In such cases, computerized runs of methods 400 and 700 may be used for purposes of data acquisition. For example, the first results and/or the second results may serve as inputs to the machine learning. The machine learning in the algorithm may be able to learn from both successful and failed test scenarios, and thus update and in some cases correct and/or improve the algorithm itself.

Turning now to FIG. 8, it illustrates one example of a generalized flow chart diagram of a methodology 800 for additional testing of AUT(s) 220, in accordance with certain embodiments of the presently disclosed subject matter. The additional testing of 800 is optional, and provides example methods that may be used in some example cases to provide additional verification of the AUT or AUTs 220.

The process starts at step 803. The first stage of this optional additional methodology may involve a replay of a sub-set of the verification test scenario set generated in 705, to provide additional validation of the scenario results. In some examples, Replay Analyzer 368, possibly a part of verification module 340 running on processor 325, may retrieve the set of second results, including the grades of all verification test scenarios, from 374.

In step 805, some or all of those verification test scenarios that failed may be chosen, if there are any failed verification test scenarios. Responsive to determining that at least one second result, within the set of second results, did not meet the set of score criteria, and thus is indicative of a failed verification test scenario, one or more of these failed verification test scenarios may be selected for replay. This selection step may be done, for example, by the replay analyzer 368.

In step 810, a statistically significant number of second results within the set of second results that did meet algorithm verification test criteria (that is, successful verification test scenarios) may be selected, each second result corresponding to a scenario that was run. The statistically significant number of second results determined in step 810 may be significantly smaller than the statistically significant number of algorithm verification test scenarios determined, for example, in step 430. The scenarios chosen may be selected in a pseudo-random fashion. The required number of second results determined in step 810 may be determined using known statistical methods. In some example cases, this number may be 10. In some example cases, this number may be 20. In some cases, it may be 30. In some cases, it may be 100. In some cases, it may be 500. This selection step may be done, for example, by the replay analyzer 368.

As a result of steps 805 and 810, a statistically significant number of successful verification test scenarios, as well as some or all of the failed verification test scenarios (if there are any), may have been selected. The second results of these two selected sets of scenarios, together, as well as the logs of detailed results that may have been stored as well in 373, may be referred to herein as third results.

In step 815, the third results may be replayed. This step may be done, for example, by the replay analyzer 368. In some cases, the log of detailed results stored as in 373 may be replayed, step by step, e.g. moving forward in time, from the start of each scenario to its end.

In step 820, the third results that were replayed may be analyzed, to determine whether they meet one or more test validity criteria. One non-limiting example of such test validity criteria may be that all autonomous vehicles in the scenario are at all times in a valid driving location, e.g. that no vehicle is at some point off of the road, or in the sky etc. Another example criterion is that no pedestrian was at some point in an invalid location (in the sky, walked through a wall etc.) Another example is that a vehicle speed at some point was above its maximum possible speed. Any such situation, or similar obvious errors that show that the scenario was not realistic, would indicate some error in the simulation framework 270, and/or in the verification system 210, and would indicate that the test results cannot be considered a valid test of the AUT. In some examples, such test validity criteria may have been defined as part of the performance requirements definition of step 410, and they may have been stored in 375. In some cases the replay analyzer 368 may perform this function, and it may for example be programmed with various laws of mechanics that may not be violated.

Note that in some examples, 815 and parts of 820 may be done together. That is, as a scenario is replayed, it may be analyzed at the same time with respect to the test validity criteria.

In response to determining that the third results do not meet the one or more test validity criteria, the process may proceed to step 822. In some cases the replay analyzer 368 may generate a report indicating non-validity of the set of second results, that is the simulation verification test results that were performed for example in step 440. The report may also include a description of the specific failures, and/or portions of the replay and logs data that support the determination of non-validity. In step 825, the testing and development teams may be notified that the verification system 210 and/or simulation framework 270 may need to be modified.

In response to determining that the third results do meet the one or more test validity criteria, the process may proceed to step 827. In some cases the replay analyzer 368 may generate a report indicating validity of the set of second results, that is the simulation verification test results that were performed for example in step 440.

In some cases the verification system 210, including a replay analyzer 368, may be referred to herein also as a replaying system. In other example cases, the replaying system that includes the replay analyzer 368 may reside on a system separate system from the verification system 210. The architecture of FIG. 3b is only an example.

In some cases, the replaying system may output the replay results to a graphical interface. In the example architecture of FIG. 3b, replay analyzer 368 may replay the third results via user outputs module 364 to output devices 338, which may display the particular scenario of autonomous vehicle movement graphically, e.g. on 2-D or 3-D map representation, possibly also with accompanying graphs and tables. In the case of a graphical interface, the decision step 820 of whether the results are valid may in some examples be performed partly or entirely by a human operator, who monitors the graphic displays.

Steps 805 to 827 may be referred to herein as replay tests. The replay tests procedure, exemplified by steps 805 to 827, may for example be performed to provide additional validation of the verification test scenario results, if the process reached step 470 and the verification tests failed. In some examples, the method exemplified by steps 805 to 827 may be performed also in cases where the statistical criteria were not met in step 450. The determination whether scenarios meet test validity criteria may be helpful to determine why the tests failed in step 450. For example, it may be possible to determine whether the AUT or the simulation framework were the main contributors to the verification test failure.

Note that the use of method 400 together with steps 805 to 827 has been described above mainly in terms of a use to verify a previously-developed algorithm. In some example cases, these methods, or parts of them, for example the replaying of the third results, and the systems that run them, may also be usable as developer tools at various stages of the algorithm development process itself, before the AUT is handed off to a verification test team. The systems may be configurable for use as such developer tools.

The process may continue with an additional optional stage of the methodology. This additional stage may, in some non-limiting example cases, be performed in response to determining that the third results meet the test validity criterion in step 820.

This additional stage may start with step 830—determining a statistically significant number of external-verification test scenarios to generate within the operational environment. (Recall that the operational environment may have been defined in Step 405.).

The statistically significant number of external-verification test scenarios determined in step 830 may be significantly smaller than the statistically significant number of algorithm verification test scenarios determined, for example, in step 430. The scenarios chosen may be selected in a pseudo-random fashion. The required number of external-verification test scenarios determined in step 830 may be determined using known statistical methods. In some example cases, this number may be 10. In some example cases, this number may be 20. In some cases, it may be 30. In some cases, it may be 100. In some cases, it may be 500. In some cases, it may be 1,000.

Step 830 may continue with generating the set of external-verification test scenarios. The external-verification test scenarios may include information such as the number and type of autonomous vehicles, time of day, date, day of week, the road network and mission objectives used etc. In some cases, the operational environment used for this generation may be somewhat modified, in order to meet the constraints of e.g. real-world testing performed on real roads in real cities and regions. In other cases, a generated scenario may be compared to real-life roads, and the best-match road network to the generated scenario may be used in its place. In this sense, some or all external-verification test scenarios performed may be said to correspond to the external-verification test scenarios that were generated by the system. The scenarios generated may be referred to herein as an external-verification scenario set.

Step 830 could in some examples be performed by replay analyzer 368, or by scenario generator 352.

In step 835, external-verification tests that correspond to the external-verification scenario set may be performed, thereby generating fourth results. In some examples, these external-verification tests may be performed external to the verification system 210 and the replay analyzer 368. This external-verification testing may use real-life equipment (autonomous vehicles configured with the relevant AUTs, sensors, management systems etc.), real travelling roads and terrain, possibly monitored by human test personnel. The external-verification test scenarios may thus in some cases be referred to herein also as real-world test verification scenarios for real-world verification testing. The fourth results are evaluated using the Performance Assessment Functions (F-PAFs and S-PAFs), in order to evaluate performance of the AUT in these external-verification test scenarios.

In step 840, a statistical analysis may be performed, to compare the set of fourth results s to the set of second results, using for example, known statistical methods. The purpose of the comparison may be to determine whether the verification tests run on the simulated framework (run for example in step 440) and the external-verification tests (run for example in step 835), represent the same population with the required statistical significance. One non-limiting example of such a statistical analysis may be a Statistical Hypothesis Analysis.

In step 845, based on this statistical analysis, a determination may be made, whether the second results, e.g. created in step 440, meet one or more external-verification test validity criteria. The external-verification test validity criteria may also be referred to herein as real-world test validity criteria. One non-limiting example of these criteria may be that the Statistical Hypothesis Analysis yields a positive result, i.e. that the hypothesis analysis supports the assumption that the two test runs (the simulated verification test runs and the external/real-world test runs) represent the same population with the required statistical significance.

In step 850, a determination may have been made that the second results meet the one or more external-verification test validity criteria. It may follow that there is additional confirmation that the safety and functional performance of the AUT, as evaluated in the algorithm verification tests run on the simulation, represents the real performance of the AUT. Therefore, if the AUT managed to meet the safety and functional standard criteria in the simulated runs, there is additional verification that the AUT can be accepted as safe and sufficiently high-performing from a functional point of view. In response to this determination, a report to that effect may be generated. In step 855, a determination may have been made that the second results do not meet one or more external-verification test validity criteria. For example, the hypothesis analysis may show that the results from external-verification tests are not consistent with the simulation verification test results, for example that the two test runs do not represent the same population with the required statistical significance. In such a case, there may be a need for the development and testing teams to correct the simulation framework 270 and/or the verification system 210. In response to this determination, a report to that effect may be generated. In step 860, the testing and/or the development teams may be notified that the simulation framework 270 and/or the verification system 210 may need to be modified.

Note that in some cases, the replay tests and the external-verification tests may not be performed in the order shown in method 800. For example, in some cases the external-verification tests may be performed, without performing the replay tests. Similarly, in some cases the external-verification tests may be performed prior to the verification test process exemplified by steps 430 to 480 and method 700. However, in some cases such an order may be more costly, compared to first running the verification test on the simulation framework.

Note that the use of method 400, in some cases together with method 800, has been described above mainly in terms of a use to verify a previously-developed algorithm, in a post-development verification test process. In some example cases, these methods, or parts of them, and the systems that run them, may also be usable for certification testing. For example, the systems may be configurable for such certification testing. For example, an agency such as a Ministry of Transportation may be handed an AUT for certification. The agency may then run the verification system, generate first, second, third and/or fourth results, and certify the AUT as permitted for use (or not permitted) in the particular country or other jurisdiction.

In some embodiments, one or more steps of the various flowcharts exemplified herein may be performed automatically. The flow and functions illustrated in the various flowchart figures may for example be implemented in processing circuitry 320, and may make use of components described with regard to FIGS. 3A and 3B.

It is noted that the teachings of the presently disclosed subject matter are not bound by the flowcharts illustrated in the various figures. The operations can occur out of the illustrated order. For example, definition operations 410 and 413 shown in succession can be executed substantially concurrently, or in the reverse order. Similarly, some of the operations or steps can be integrated into a consolidated operation or can be broken down to several operations, and/or other operations may be added. For example, calculation of a required numbered of test scenarios, and the generation of those scenarios, may in some cases both be performed by scenario generator 352, and in other cases be performed by separate modules. It is also noted that whilst the flowchart is described with reference to system elements that realize steps, such as for example processing circuitry 320, this is by no means binding, and the operations can be performed by elements other than those described herein.

In embodiments of the presently disclosed subject matter, fewer, more and/or different stages than those shown in the figures can be executed. In embodiments of the presently disclosed subject matter one or more stages illustrated in the figures can be executed in a different order and/or one or more groups of stages may be executed simultaneously.

In the claims that follow, alphanumeric characters and Roman numerals used to designate claim elements are provided for convenience only, and do not imply any particular order of performing the elements.

It should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the spirit of the presently disclosed subject matter.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter may be, at least partly, a suitably programmed computer. Likewise, the presently disclosed subject matter contemplates a computer program product being readable by a machine or computer, for executing the method of the presently disclosed subject matter or any part thereof. The presently disclosed subject matter further contemplates a non-transitory machine-readable or computer-readable memory tangibly embodying a program of instructions executable by the machine or computer for executing the method of the presently disclosed subject matter or any part thereof. The presently disclosed subject matter further contemplates a non-transitory computer readable storage medium having a computer readable program code embodied therein, configured to be executed so as to perform the method of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. A computerized method of performing safety and functional verification of algorithms for control of autonomous vehicles, configured for performance by a processing circuitry that comprises a processor and a memory, the method the computerized method comprising performing the following:

A. providing at least one algorithm for control of at least one autonomous vehicle;
   B. providing a computerized simulation framework, wherein the computerized simulation framework interacts with the at least one algorithm by at least providing simulated sensor data to the algorithm and receiving commands from the algorithm,
      the computerized simulation framework corresponding to the at least one simulated autonomous vehicle and to at least one operational environment,
      the computerized simulation framework including at least one of the following: at least one parameter indicative of at least one of noise or delay in at least one simulated sensor associated with the computerized simulation framework, and at least one parameter indicative of at least one of noise or delay in a response of the at least one simulated autonomous vehicle to least one command;
   C. providing at least one set of parameters of the computerized simulation framework indicative of navigation scenarios;
   D. providing at least one set of calibration criteria indicative of at least one of algorithm performance requirements or algorithm safety requirements;
   E. providing at least one set of statistical calibration criteria indicative of the at least one set of calibration criteria; and
   F. iteratively performing an adjustment, until obtaining from the computerized simulation framework an increased-severity computerized simulation framework, said adjustment comprising at least one of the following:

i) updating a value of the at least one parameter indicative of the at least one of noise or delay in the at least one simulated sensor, by increasing the at least one of noise or delay; or ii) updating a value of the at least one parameter indicative of the at least one of noise or delay in the response of the at least one simulated autonomous vehicle to the at least one command, by increasing the at least one of noise or delay, wherein the iterative performing of the adjustment comprises:

(a) performing at least one of the updating of said step (i) and the updating of said step (ii), wherein, after said updating, the updated values of the at least one parameter indicative of the at least one of noise or delay in the at least one sensor, and the updated values of the at least one parameter indicative of the at least one of noise or delay in the response of the at least one autonomous vehicle, constitute a current set of at least one of noise values and delay values;

(b) generating a number of calibration scenarios, based on at least one set of parameters of the computerized simulation framework indicative of navigation scenarios;

(c) running the number of calibration scenarios in the computerized simulation framework, based on the current set of at least one of noise values and delay values, thereby generating first results;

(d) determining whether the first results meet the at least one set of statistical calibration criteria;

(e) in response to the first results meeting the at least one set of statistical calibration criteria, performing the following:

(I) setting the current set of at least one of noise values and delay values to constitute a previous set of at least one of noise values and delay values;

(f) repeatedly performing said steps (a) to (e) until the first results do not meet the at least one set of statistical calibration criteria;

(g) setting the current set of at least one of noise values and delay values to constitute a failed set of at least one of noise values and delay values;

(h) selecting a set of at least one of noise values and delay values, which is less noisy than the failed set of at least one of noise values and delay values; and (i) setting the selected set of at least one of noise values and delay values to constitute the current set of at least one of noise values and delay values, wherein the increased-severity computerized simulation framework is based on the computerized simulation framework and on the current set of at least one of noise values and delay values, wherein the increased-severity computerized simulation framework meets a criterion that can be utilized for at least one of statistical safety verification and statistical functional performance verification of the at least one algorithm, wherein the criterion that can be utilized for at least one of statistical safety verification or statistical functional performance verification is whether the first results meet the at least one set of statistical calibration criteria.

2. The computerized method of claim 1, wherein said step (e) further comprises:

(II) recording the previous set of at least one of noise values and delay values in a list of previous sets of at least one of noise values and delay values.

3. The computerized method of claim 1, wherein said selecting a set of noise and delay values comprises selecting, from the list of previous sets of noise and delay values, one of the previous sets of noise and delay values.

4. The computerized method of claim 3, wherein the one of the previous sets of noise and delay values comprises a then-current previous set of at least one of noise values and delay values.

5. The computerized method of claim 1, wherein the at least one command is an actuator command.

6. The computerized method of claim 1, wherein the at least one sensor is a sensor associated with the vehicle.

7. The computerized method of claim 1, wherein the at least one sensor is a fixed sensor.

8. The computerized method of claim 1, wherein the number of calibration scenarios are pseudo-random calibration scenarios.

9. The computerized method of claim 5, further comprising:

(j) providing at least one set of criteria indicative of algorithm performance requirements and of algorithm safety requirements, constituting at least one set of algorithm verification test criteria;

(k) providing at least one set of statistical verification criteria, indicative of the at least one set of algorithm verification test criteria;

(l) generating said number of algorithm verification test scenarios, based on the at least one set of parameters of the computerized simulation framework indicative of navigation scenarios, said number of algorithm verification test scenarios constituting an algorithm verification scenarios set;

(m) running the algorithm verification scenario set on the computerized simulation framework, thereby generating a set of second results;

(n) determining whether the second results meet the at least one set of statistical verification criteria;

(o) in response to the second results meeting the at least one set of statistical verification criteria, generating a report indicating compliance of the at least one algorithm to the at least one set of statistical verification criteria;

(p) in response to the second results not meeting the at least one set of statistical verification criteria, generating a report indicating possible non-compliance of the at least one algorithm to the at least one set of statistical verification criteria.

10. The computerized method of claim 9, further comprising:

(q) responsive to determining that at least one second result in the set of second results does not meet the at least one set of algorithm verification test criteria, selecting the at least one second result in the set of second results that does not meet the at least one set of algorithm verification test criteria;

(r) selecting a number of second results in the set of second results that meet the at least one set of algorithm verification test criteria;

(s) setting the number of second results that meet the at least one set of algorithm verification test criteria, and the at least one second result in the set of second results that does not meet the at least one set of algorithm verification test criteria, to constitute third results;
(t) replaying the third results on a replaying system;
(u) determining whether the third results meet at least one test validity criterion;
(v) in response to determining that the third results meet the at least one test validity criterion, generating a report indicating validity of the of the set of second results;
(w) in response to determining that the third results do not meet the at least one test validity criterion, generating a report indicating non-validity of the set of second results.

11. The computerized method according to claim 10, wherein the replaying system comprises a graphical interface.

12. The computerized method according to claim 10, wherein the replaying of the third results is usable in an algorithm development process.

13. The computerized method according to claim 10, further comprising:
(x) generating a number of external-verification scenarios, said number of external-verification scenarios constituting an external-verification scenario set;
(y) performing external-verification tests that correspond to the external-verification scenario set, generating fourth results;
(z) performing a statistical analysis of the fourth results and the second results;
(aa) determining whether the fourth results and the second results meet at least one external-verification test validity criterion; and
(bb) generating a report of the determination.

14. The computerized method according to claim 13, wherein the statistical analysis of the fourth results and the second results is a statistical hypothesis analysis.

15. The computerized method of claim 13, wherein the number of external-verification scenarios is at least 10.

16. The computerized method of claim 10, wherein the number of second results is at least 10.

17. The computerized method of claim 9, wherein the number of algorithm verification test scenarios is at least 20.

18. The computerized method according to claim 1, wherein at least one of the first results or the second results serving as inputs to machine learning in updating of the algorithm.

19. The computerized method of claim 1, wherein the number of calibration scenarios is at least 10.

20. The computerized method according to claim 1, wherein the method is performed in certification testing of the algorithm.

21. The computerized method of claim 1, wherein the computerized simulation framework comprises at least one parameter indicative of at least one of noise or delay in communications between the at least one simulated autonomous vehicle and at least one management system.

22. The computerized method of claim 1, wherein the computerized simulation framework includes at least one parameter indicative of at least one of noise or delay in communications between the at least one simulated autonomous vehicle and at least one other simulated autonomous vehicle.

23. The computerized method of claim 1, wherein the at least one simulated autonomous vehicle comprises at least 2 vehicles.

24. The computerized method of claim 1, wherein the at least one simulated autonomous vehicle comprises at least 100 vehicles.

25. The computerized method of claim 1, wherein the at least one simulated autonomous vehicle comprises at least 1,000 vehicles.

26. The computerized method of claim 1, wherein the at least one simulated autonomous vehicle comprises at least 10,000 vehicles.

27. The computerized method of claim 1, wherein the at least one simulated autonomous vehicle is at least one of a ground vehicle, a waterborne vehicle and an aircraft.

28. The computerized method of claim 27, wherein the ground vehicle is at least one of a private automobile, a taxi, a limousine, a bus, or a truck.

29. The method of claim 1, wherein the updating of said step (i) and the updating of said step (ii) comprise updating values parameters of the at least parameter based on at least one of a priority and a defined order of parameters.

30. A non-transitory program storage device, readable by a computer, tangibly embodying computer readable instructions executable by the computer to perform a method; the method comprising:
A. providing at least one algorithm for control of at least one autonomous vehicle;
B. providing a computerized simulation framework, wherein the computerized simulation framework interacts with the at least one algorithm by at least providing simulated sensor data to the algorithm and receiving commands from the algorithm,
the computerized simulation framework corresponding to the at least one simulated autonomous vehicle and to at least one operational environment,
the computerized simulation framework including at least one of the following: at least one parameter indicative of at least one of noise or delay in at least one simulated sensor associated with the computerized simulation framework, and at least one parameter indicative of at least one of noise or delay in a response of the at least one simulated autonomous vehicle to least one command;
C. providing at least one set of parameters of the computerized simulation framework indicative of navigation scenarios;
D. providing at least one set of calibration criteria indicative of at least one of algorithm performance requirements or algorithm safety requirements;
E. providing at least one set of statistical calibration criteria indicative of the at least one set of calibration criteria; and
F. iteratively performing an adjustment, until obtaining from the computerized simulation framework an increased-severity computerized simulation framework,
said adjustment comprising at least one of the following:
i) updating a value of the at least one parameter indicative of the at least one of noise or delay in the at least one simulated sensor, by increasing the at least one of noise or delay; or
ii) updating a value of at the least one parameter indicative of the at least one of noise or delay in the response of the at least one simulated autonomous vehicle to the at least one command, by increasing the at least one of noise or delay,
wherein the iterative performing of the adjustment comprises:
(a) performing at least one of the updating of said step (i) and the updating of said step (ii), wherein, after said updating, the updated values of the at least one parameter indicative of at the least one of noise or delay in the at least one sensor, and the updated values of the at least one parameter indicative of the at least one of noise or delay in the response of the at least one autonomous vehicle, constitute a current set of at least one of noise values and delay values;

(b) generating a number of calibration scenarios, based on at least one set of parameters of the computerized simulation framework indicative of navigation scenarios;

(c) running the number of calibration scenarios in the computerized simulation framework, based on the current set of at least one of noise values and delay values, thereby generating first results;

(d) determining whether the first results meet the at least one set of statistical calibration criteria;

(e) in response to the first results meeting the at least one set of statistical calibration criteria, performing the following:

(I) setting the current set of at least one of noise values and delay values;

(f) repeatedly performing said steps (a) to (e) until the first results do not meet the at least one set of statistical calibration criteria;

(g) setting the current set of at least one of noise values and delay values to constitute a failed set of at least one of noise values and delay values;

(h) selecting a set of at least one of noise values and delay values, which is less noisy than the failed set of at least one of noise values and delay values; and (i) setting the selected set of at least one of noise values and delay values to constitute the current set of at least one of noise values and delay values, wherein the increased-severity computerized simulation framework is based on the computerized simulation framework and on the current set of at least one of noise values and delay values, wherein the increased-severity computerized simulation framework meets a criterion that can be utilized for at least one of statistical safety verification and statistical functional performance verification of the at least one algorithm, wherein the criterion that can be utilized for at least one of statistical safety verification or statistical functional performance verification is whether the first results meet the at least one set of statistical calibration criteria.

31. The non-transitory program storage device of claim 30, wherein said step (e) further comprises:

(II) recording the previous set of at least one of noise values and delay values in a list of previous sets of at least one of noise values and delay values.

32. The non-transitory program storage device of claim 30, further configured to:

(j) provide at least one set of criteria indicative of algorithm performance requirements and of algorithm safety requirements, constituting at least one set of algorithm verification test criteria;

(k) provide at least one set of statistical verification criteria, indicative of the at least one set of algorithm verification test criteria;

(l) generate said number of algorithm verification test scenarios, based on the at least one set of parameters of significant number of algorithm verification test scenarios constituting an algorithm verification scenarios set;

(m) run the algorithm verification scenario set on the computerized simulation framework, thereby generating a set of second results;

(n) determine whether the second results meet the at least one set of statistical verification criteria;

(o) in response to the second results meeting the at least one set of statistical verification criteria, generate a report indicating compliance of the at least one algorithm to the at least one set of statistical verification criteria;

(p) in response to the second results not meeting the at least one set of statistical verification criteria, generate a report indicating possible non-compliance of the at least one algorithm to the at least one set of statistical verification criteria.

33. The non-transitory program storage device of claim 32, further configured to:

(q) responsive to determining that at least one second result in the set of second results does not meet the at least one set of algorithm verification test criteria, select the at least one second result in the set of second results that does not meet the at least one set of algorithm verification test criteria;

(r) select a number of second results in the set of second results that meet the at least one set of algorithm verification test criteria;

(s) set the number of second results that meet the at least one set of algorithm verification test criteria, and the at least one second result in the set of second results that does not meet the at least one set of algorithm verification test criteria, to constitute third results;

(t) replay the third results on a replaying system;

(u) determine whether the third results meet at least one test validity criterion;

(v) in response to determining that the third results meet the at least one test validity criterion, generate a report indicating validity of the of the set of second results;

(w) in response to determining that the third results do not meet the at least one test validity criterion, generate a report indicating non-validity of the set of second results.

34. A system configured for performing safety and functional verification of algorithms for control of autonomous vehicles, comprising a processing circuitry that comprises a processor and a memory, and configured to perform the following:

A. providing at least one algorithm for control of at least one autonomous vehicle;

B. providing a computerized simulation framework, wherein the computerized simulation framework interacts with the at least one algorithm by at least providing simulated sensor data to the algorithm and receiving commands from the algorithm, the computerized simulation framework corresponding to the at least one simulated autonomous vehicle and to at least one operational environment, the computerized simulation framework including at least one of the following: at least one parameter indicative of at least one of noise or delay in at least one simulated sensor associated with the computerized simulation framework, and at least one parameter indicative of at least one of noise or delay in a response of the at least one simulated autonomous vehicle to least one command;

C. providing at least one set of parameters of the computerized simulation framework indicative of navigation scenarios;

D. providing at least one set of calibration criteria indicative of at least one of algorithm performance requirements or algorithm safety requirements;
E. providing at least one set of statistical calibration criteria indicative of the at least one set of calibration criteria; and
F. iteratively perform an adjustment, until obtaining from the computerized simulation framework an increased-severity computerized simulation framework, said adjustment comprising at least one of the following:
  i) updating a value of the at least one parameter indicative of the at least one of noise or delay in the at least one simulated sensor; or
  ii) updating a value of the at least one parameter indicative of a the t least one of noise or delay in the response of the at least one simulated autonomous vehicle to the at least one command, wherein the iterative performing of an adjustment comprises:
  (a) performing at least one of the updating of said step (i) and the updating of said step (ii), wherein, after said updating, the updated values of the at least one parameter indicative of the at least one of noise or delay in the at least one sensor, and the updated values of the at least one parameter indicative of the at least one of noise or delay in the response of the at least one autonomous vehicle constitute a current set of at least one of noise values and delay values;
  (b) generating a number of calibration scenarios, based on at least one set of parameters of the computerized simulation framework indicative of navigation scenarios;
  (c) running the number of calibration scenarios in the computerized simulation framework, based on the current set of at least one of noise values and delay values, thereby generating first results;
  (d) determining whether the first results meet the at least one set of statistical calibration criteria;
  (e) in response to the first results meeting the at least one set of statistical calibration criteria, performing the following:
    (I) setting the current set of at least one of noise values and delay values to constitute a previous set of at least one of noise values and delay values;
  (f) repeatedly performing said steps (a) to (e) until the first results do not meet the at least one set of statistical calibration criteria;
  (g) setting the current set of at least one of noise values and delay values to constitute a failed set of at least one of noise values and delay values; and
  (h) selecting a set of at least one of noise values and delay values, which is less noisy than the failed set of at least one of noise values and delay values; and
  (i) setting the selected set of at least one of noise values and delay values to constitute the current set of at least one of noise values and delay values;
  wherein the increased-severity computerized simulation framework is based on the computerized simulation framework and on the current set of at least one of noise values and delay values,
  wherein the increased-severity computerized simulation framework meets a criterion that can be utilized for at least one of statistical safety verification and statistical functional performance verification of the at least one algorithm,
  wherein the criterion that can be utilized for at least one of statistical safety verification or statistical functional performance verification is whether the first results meet the at least one set of statistical calibration criteria.

35. The system of claim 34, wherein said step (e) further comprises:
  (II) recording the previous set of at least one of noise values and delay values in a list of previous sets of at least one of noise values and delay values.

36. The system of claim 34, further configured to:
  (j) provide at least one set of criteria indicative of algorithm performance requirements and of algorithm safety requirements, constituting at least one set of algorithm verification test criteria;
  (k) provide at least one set of statistical verification criteria, indicative of the at least one set of algorithm verification test criteria;
  (l) generate said number of algorithm verification test scenarios, based on the at least one set of parameters of the computerized simulation framework indicative of navigation scenarios, said statistically significant number of algorithm verification test scenarios constituting an algorithm verification scenarios set;
  (m) run the algorithm verification scenario set on the computerized simulation framework, thereby generating a set of second results;
  (n) determine whether the second results meet the at least one set of statistical verification criteria;
  (o) in response to the second results meeting the at least one set of statistical verification criteria, generate a report indicating compliance of the at least one algorithm to the at least one set of statistical verification criteria;
  (p) in response to the second results not meeting the at least one set of statistical verification criteria, generate a report indicating possible non-compliance of the at least one algorithm to the at least one set of statistical verification criteria.

37. The system of claim 36, further configured to:
  (q) responsive to determining that at least one second result in the set of second results does not meet the at least one set of algorithm verification test criteria, select the at least one second result in the set of second results that does not meet the at least one set of algorithm verification test criteria;
  (r) select a number of second results in the set of second results that meet the at least one set of algorithm verification test criteria;
  (s) set the number of second results that meet the at least one set of algorithm verification test criteria, and the at least one second result in the set of second results that does not meet the at least one set of algorithm verification test criteria, to constitute third results;
  (t) replay the third results on a replaying system;
  (u) determine whether the third results meet at least one test validity criterion;
  (v) in response to determining that the third results meet the at least one test validity criterion, generate a report indicating validity of the of the set of second results; and
  (w) in response to determining that the third results do not meet the at least one test validity criterion, generate a report indicating non-validity of the set of second results.

* * * * *